US007833095B2

(12) United States Patent
Cuddy et al.

(10) Patent No.: US 7,833,095 B2
(45) Date of Patent: *Nov. 16, 2010

(54) GAMING DEVICE HAVING AN ADJACENT SELECTION BONUS SCHEME

(75) Inventors: Ryan W. Cuddy, Reno, NV (US); Joseph E. Kaminkow, Reno, NV (US); Carl L. Blomquist, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 569 days.

This patent is subject to a terminal disclaimer.

(21) Appl. No.: 11/621,319

(22) Filed: Jan. 9, 2007

(65) Prior Publication Data

US 2007/0111783 A1 May 17, 2007

Related U.S. Application Data

(63) Continuation of application No. 10/845,708, filed on May 14, 2004, now Pat. No. 7,160,186, which is a continuation of application No. 10/837,967, filed on May 3, 2004, now Pat. No. 6,913,533, which is a continuation of application No. 09/963,974, filed on Sep. 26, 2001, now Pat. No. 6,733,386.

(51) Int. Cl.
*A63F 13/00* (2006.01)

(52) U.S. Cl. .............................. 463/25; 463/16; 463/20

(58) Field of Classification Search ............. 463/16–20, 463/1, 6, 21, 40–42, 25
See application file for complete search history.

(56) References Cited

U.S. PATENT DOCUMENTS 4,695,053 A 9/1987 Vazquez, Jr. et al.

(Continued)

FOREIGN PATENT DOCUMENTS

GB 2 092 797 8/1982

(Continued)

OTHER PUBLICATIONS

Jackpot Party Brochures and Articles written by WMS Gaming, Inc., published in 1998.

(Continued)

*Primary Examiner*—Ronald Laneau
*Assistant Examiner*—Ross A. Williams
(74) *Attorney, Agent, or Firm*—K & L Gates LLP

(57) ABSTRACT

A gaming device having a bonus game with an adjacent selection feature. In one embodiment of the present invention, the gaming device provides a plurality of adjacent player selectable selections. An award is associated with each player selectable selection. The award associated with each selectable selection is not initially displayed or revealed to the player. The player selectable selections are arranged or grouped into a plurality of associated or related selection sets. In one embodiment, each selection set has a different number of player selectable selections. In one embodiment, the related plurality of selection sets are arranged adjacent to each other to enable each player selectable selection in one set to be adjacent to at least one player selectable selection from another selection set. The player's pick in each selection set limits the available selections in the subsequent selection sets.

20 Claims, 20 Drawing Sheets

U.S. PATENT DOCUMENTS

| | | | |
|---|---|---|---|
| 5,092,598 A | 3/1992 | Kamille | |
| 5,205,555 A | 4/1993 | Humano | |
| 5,342,047 A | 8/1994 | Heidel et al. | |
| 5,647,798 A | 7/1997 | Falciglia | |
| 5,766,074 A | 6/1998 | Cannon et al. | |
| 5,769,716 A | 6/1998 | Saffari et al. | |
| 5,788,573 A | 8/1998 | Baerlocher et al. | |
| 5,927,714 A | 7/1999 | Kaplan | |
| 5,947,820 A | 9/1999 | Morro et al. | |
| 5,964,463 A | 10/1999 | Moore, Jr. | |
| 5,980,384 A | 11/1999 | Barrie | |
| 5,996,997 A | 12/1999 | Kamille | |
| 5,997,401 A | 12/1999 | Crawford | |
| 6,015,346 A | 1/2000 | Bennett | |
| 6,056,642 A | 5/2000 | Bennett | |
| 6,059,289 A | 5/2000 | Vancura | |
| 6,062,980 A | 5/2000 | Luciano | |
| 6,089,976 A | 7/2000 | Schneider et al. | |
| 6,089,977 A | 7/2000 | Bennett | |
| 6,102,798 A | 8/2000 | Bennett | |
| 6,120,031 A | 9/2000 | Adams | |
| 6,126,542 A | 10/2000 | Fier | |
| 6,135,885 A | 10/2000 | Lermusiaux | |
| 6,159,095 A | 12/2000 | Frohm et al. | |
| 6,159,096 A | 12/2000 | Yoseloff | |
| 6,159,097 A | 12/2000 | Gura | |
| 6,159,098 A | 12/2000 | Slomiany et al. | |
| 6,168,520 B1 | 1/2001 | Baerlocher et al. | |
| 6,173,955 B1 | 1/2001 | Perrie et al. | |
| 6,174,235 B1 | 1/2001 | Walker et al. | |
| 6,190,254 B1 | 2/2001 | Bennett | |
| 6,190,255 B1 | 2/2001 | Thomas et al. | |
| 6,203,429 B1 | 3/2001 | Demar et al. | |
| 6,231,442 B1 | 5/2001 | Mayeroff | |
| 6,231,445 B1 | 5/2001 | Acres | |
| 6,261,177 B1 | 7/2001 | Bennett | |
| 6,270,412 B1 | 8/2001 | Crawford et al. | |
| 6,290,600 B1 | 9/2001 | Glasson | |
| 6,296,568 B1 | 10/2001 | Tracy | |
| 6,309,300 B1 | 10/2001 | Glavich | |
| 6,315,664 B1 | 11/2001 | Baerlocher et al. | |
| 6,319,124 B1 | 11/2001 | Baerlocher et al. | |
| 6,336,860 B1 | 1/2002 | Webb | |
| 6,346,043 B1 | 2/2002 | Colin et al. | |
| 6,375,187 B1 | 4/2002 | Baerlocher | |
| 6,413,161 B1 | 7/2002 | Baerlocher et al. | |
| 6,439,995 B1 * | 8/2002 | Hughs-Baird et al. | 463/20 |
| 6,461,241 B1 | 10/2002 | Webb et al. | |
| 6,464,582 B1 | 10/2002 | Baerlocher et al. | |
| 6,494,785 B1 | 12/2002 | Gerrard et al. | |
| 6,506,118 B1 | 1/2003 | Baerlocher et al. | |
| 6,514,141 B1 | 2/2003 | Kaminkow et al. | |
| 6,569,015 B1 | 5/2003 | Baerlocher et al. | |
| 6,575,830 B2 | 6/2003 | Baerlocher et al. | |
| 6,585,591 B1 | 7/2003 | Baerlocher et al. | |
| 6,595,854 B2 | 7/2003 | Hughs-Baird et al. | |
| 6,599,192 B1 | 7/2003 | Baerlocher et al. | |
| 6,632,141 B2 | 10/2003 | Webb et al. | |
| 6,648,754 B2 | 11/2003 | Baerlocher et al. | |
| 6,692,355 B2 | 2/2004 | Baerlocher et al. | |
| 6,719,632 B2 | 4/2004 | Palmer et al. | |
| 6,722,981 B2 | 4/2004 | Kaminkow et al. | |
| 6,722,982 B2 | 4/2004 | Kaminkow et al. | |
| 6,733,386 B2 * | 5/2004 | Cuddy et al. | 463/17 |
| 6,758,750 B2 | 7/2004 | Baerlocher et al. | |
| 6,786,820 B2 | 9/2004 | Gerrard et al. | |
| 6,793,579 B2 | 9/2004 | Baerlocher et al. | |
| 6,796,905 B2 | 9/2004 | Baerlocher et al. | |
| 6,808,452 B2 | 10/2004 | Baerlocher et al. | |
| 6,808,454 B2 | 10/2004 | Gerrard et al. | |
| 6,811,483 B1 | 11/2004 | Webb et al. | |
| 6,852,030 B2 | 2/2005 | Baerlocher et al. | |
| 6,890,257 B2 | 5/2005 | Baerlocher | |
| 6,899,623 B2 | 5/2005 | Baerlocher | |
| 6,913,533 B2 * | 7/2005 | Cuddy et al. | 463/16 |
| 6,942,566 B2 | 9/2005 | Baerlocher et al. | |
| 6,960,132 B2 | 11/2005 | Baerlocher et al. | |
| 6,966,833 B2 | 11/2005 | Kaminkow et al. | |
| 6,971,953 B2 | 12/2005 | Gerrard et al. | |
| 7,160,186 B2 * | 1/2007 | Cuddy et al. | 463/16 |
| 2002/0025844 A1 | 2/2002 | Casey et al. | |
| 2002/0045475 A1 | 4/2002 | Glavich et al. | |
| 2002/0072402 A1 | 6/2002 | Baerlocher | |
| 2002/0137217 A1 * | 9/2002 | Rowe | 436/42 |
| 2002/0142822 A1 | 10/2002 | Baerlocher et al. | |
| 2002/0151350 A1 | 10/2002 | Baerlocher et al. | |
| 2002/0155883 A1 | 10/2002 | Baerlocher | |
| 2003/0013514 A1 | 1/2003 | Cregan et al. | |
| 2003/0040355 A1 | 2/2003 | Baerlocher | |
| 2003/0045344 A1 | 3/2003 | Webb et al. | |
| 2003/0045348 A1 | 3/2003 | Palmer et al. | |
| 2003/0064795 A1 | 4/2003 | Baerlocher et al. | |
| 2004/0038729 A1 | 2/2004 | Webb et al. | |
| 2004/0180710 A1 | 9/2004 | Palmer et al. | |
| 2004/0185928 A1 | 9/2004 | Baerlocher et al. | |
| 2005/0020346 A1 | 1/2005 | Baerlocher | |
| 2005/0032567 A1 | 2/2005 | Baerlocher et al. | |
| 2005/0037829 A1 | 2/2005 | Baerlocher et al. | |
| 2005/0101375 A1 | 5/2005 | Webb et al. | |
| 2005/0130729 A1 | 6/2005 | Baerlocher et al. | |
| 2005/0187010 A1 | 8/2005 | Baerlocher | |
| 2005/0266914 A1 | 12/2005 | Baerlocher et al. | |
| 2006/0003837 A1 | 1/2006 | Baerlocher et al. | |

FOREIGN PATENT DOCUMENTS

| | | |
|---|---|---|
| GB | 2 144 644 | 3/1985 |

OTHER PUBLICATIONS

Top Dollar Brochure written by IGT, published in 1998.

Fortune Cookie Brochure written by IGT, published in 2000.

Pick to Win Payout, published prior to 2001.

Bingo written by Casino Data Systems, published in 1998.

18 Reeler, written by IGT, published prior to 2001.

Spellbinder written by IGT, published in 2000.

Leopard Spots written by Olympic Video Gaming, publication date unknown.

Q*bert board game instructions written by Parker Brothers, published in 1983.

How to play Q*bert written by Gottlieb Amusement Games, published in 1982 and printed from http://users.rcn.com/e-glide/howto1.jpg and http://users.rcn.com/e-glide/howto2.jpg on Mar. 12, 2002.

The Creation of Q*Bert written by Warren Davis, printed from http://www.coinop.org/features/qbstory.html on Mar. 12, 2002.

The History of Q*Bert written by Jeff Lee, published in 1998 and printed from http://users.aol.com/JPMLee/qbert.htm on Mar. 12, 2002.

Q*bert: Classic Video Game Surrealism from the Golden Age of Arcade Games written by e-glide and printed from http://users.rcn.com/e-glide/qbert2.html on Mar. 12, 2002.

Q*bert video game cartridge instructions for ATARI home computer written by Parker Brothers and Arcade/Action Software, printed from http://www.hasbro.com/default.asp?x=cc_gameandtoyinstructions on Mar. 12, 2002.

Q*bert video game cartridge instructions for ATARI 2600 game system written by Parker Brothers, printed from http://www.hasbro.com/default.asp?x=cc_gameandtoyinstructions on May 12, 2002.

Q*bert video game cartridge instructions for Colecovision game system written by Parker Brothers, printed from http://www.hasbro.com/default.asp?x=cc_gameandtoyinstructions on Mar. 12, 2002.

Q*bert video game cartridge instructions for Commodore 64 game system written by Parker Brothers and Arcade/Action Software, printed from http://www.hasbro.com/default.asp?x=cc_gameandtoyinstructions on Mar. 12, 2002.

Q*bert video game cartridge instructions for Intellivision game system written by Parker Brothers, printed from http://www.hasbro.com/default.asp?x=cc_gameandtoyinstructions on Mar. 12, 2002.

Q*bert video game cartridge instructions for Texas Instruments 99/4A game system written by Parker Brothers and Arcade/Action Software, printed from http://www.hasbro.com/default.asp?x=cc_gameandtoyinstructions on Mar. 12, 2002.

Q*bert game description written by The Killer List of Videogames published in 2002, printed from http://www.klov.com/Q/Q*bert.html on Mar. 12, 2002.

Q*bert's Qubes game description written by The Killer List of Videogames published in 2002, printed from http://www.klov.com/Q/Q*bert's_Qubes.html on Mar. 12, 2002.

Faster Harder More Challenging Q*bert game description written by The Killer List of Videogames, published in 2002 and printed from http://www.klov.com/F/Faster_Harder_More_Challenging_Q*bert.html on Mar. 12, 2002.

Gotlieb Emulator Project written by Lee Taylor, published in 1996 and printed from http://www.defender.demon.co.uk/qbert.html on Mar. 12, 2002.

Q*Bert video game advertisement written by Pennsylvania Gameroom Warehouse, printed from http://www.gameroomwarehouse.com/videogame/qbert.html on Mar. 12, 2002.

Q-Bert video game advertisement for PlayStation printed from http://www.amazon.com on Mar. 12, 2002.

* cited by examiner

GAMING DEVICE HAVING AN ADJACENT SELECTION BONUS SCHEME

PRIORITY CLAIM

This application is a continuation application of U.S. patent application Ser. No. 10/845,708, filed on May 14, 2004, entitled "Gaming Device Having An Adjacent Selection Bonus Scheme" which is a continuation application of U.S. patent application Ser. No. 10/837,967, filed on May 3, 2004, entitled "Gaming Device Having An Adjacent Selection Bonus Scheme", now U.S. Pat. No. 6,913,533, which is a continuation of U.S. patent application Ser. No. 09/963,974, filed on Sep. 26, 2001, entitled "Gaming Device Having An Adjacent Selection Bonus Scheme," now U.S. Pat. No. 6,773, 386.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to a gaming device, and more particularly to a gaming device having an adjacent selection bonus scheme.

Gaming machines currently exist with bonus games in which a player has one or more opportunities to choose bonus awards that are initially masked from a group of symbols arranged in a pattern displayed to the player. When the player chooses a masked symbol from the pattern, the game removes the mask and either reveals a bonus value or reveals a bonus terminator which terminates the bonus game. The outcome depends upon whether the player picks an award or terminator. The processor of the gaming machine randomly places a predetermined number of bonus awards and bonus terminators in the pattern at the beginning of the bonus round and maintains the positioning until the bonus round terminates.

When the player picks a symbol that awards a bonus value, the player receives bonus credits and the bonus game typically displays a message that the player may continue and enables the player to pick another symbol. The player then picks another masked symbol, and the process continues until the player picks a bonus round terminator. European Patent Application No. EP 0 945 837 A2 discloses a bonus game of this type.

Certain implementations of this type of bonus scheme for a gaming device have been implemented in gaming machines of various types. While this type of gaming device has achieved significant popularity in the gaming industry, after playing the game repeatedly, players may lose interest in the game. To increase player enjoyment and excitement, it is desirable to provide players with new bonus games where the players have multiple opportunities to receive winning payouts. In particular, it is desirable to provide players with opportunities to receive awards from multiple levels of the bonus game or from multiple groups of awards, wherein the multiple levels and multiple groups form a theme that provides entertainment and excitement for the player.

SUMMARY OF THE INVENTION

The present invention provides a gaming device having a bonus game with an adjacent selection feature. In one embodiment of the present invention, the gaming device provides a plurality of adjacent player selectable selections. An award is associated with each player selectable selection. The award associated with each selectable selection is not initially displayed or revealed to the player. The player selectable selections are arranged or grouped into a plurality of associated or related selection sets. In one embodiment, each selection set has a different number of player selectable selections. In one embodiment, the related plurality of selection sets are arranged adjacent to each other to enable each player selectable selection in one set to be adjacent to at least one player selectable selection from another selection set. The player's pick in each selection set limits the available selections in the subsequent selection sets.

Upon the triggering of the bonus game, the gaming device enables a player to pick a selectable selection from an initial set of selections. In one embodiment, as the player selects each selection, the award associated with the selected selection is revealed. In another embodiment, as the player selects each selection, the award associated with the selected selection as well as the awards associated with the non-selected selections in that selection set are revealed. Revealing the awards associated with the selectable selections that the player does not select increases player excitement and enjoyment by showing the player lost opportunities and the player's relative success or failure in the bonus game. In another embodiment, the selected selection is highlighted but not immediately revealed to the player. After a selection has been selected from a selection set, the non-selected selections from that selection set become spent or marked and may no longer be selected by the player. Thus, in this embodiment, the gaming device enables the player to select one selection from each selection set.

After the player has selected an initial selection, the gaming device enables the player to select a selection from a related selection set that is adjacent or otherwise related to the player's last selected selection (in the previous selection set). It should be appreciated that by enabling the player to only select selections that are adjacent or otherwise related to the last selected selection (in the previous selection group), with every selection the player is eliminating the possibility of obtaining the award associated with at least one selectable selection in a subsequent selection set. It should also be appreciated that each player selection may effect the possibility of obtaining awards associated with selections in a plurality of subsequent selection groups. In one embodiment, the award associated with the second selection set is highlighted and revealed to the player. In another embodiment, the selected selection from the second set is highlighted and not immediately revealed to the player. It should be appreciated that in this embodiment, the prior selected highlighted selection remains highlighted during subsequent player picks of selectable selections. In another embodiment, as each subsequent selected selection is highlighted, the gaming device reveals the award associated with prior selected selections from previous selection sets. The non-selected selections from the second selection set become spent or marked and cannot be selected by the player in subsequent selections as described above.

If the player has not selected one selection from each selection set, the gaming device enables the player to select another selection from a related selection set that is adjacent or related to the last selected selection and the bonus game proceeds as described above. In one embodiment, the game highlights each selected selection and reveals the award associated with the selected selection. In this embodiment, if the player has selected one selection from each selection set, the gaming device provides the player the sum total of all revealed awards and the bonus game ends. In one alternative embodiment, if the player has selected one selection from each selection set, the gaming device reveals the awards associated with all the prior selected highlighted selections. The player is awarded the sum total of the award associated with all the prior selected highlighted selections and the bonus game ends.

In an alternative embodiment of the present invention, the gaming device provides at least one termination symbol or terminator. In another embodiment, the gaming device provides a plurality of termination symbols or terminators. The termination symbols or terminators are associated with a plurality of player selectable selections. The bonus game proceeds as described in the above embodiment, but if the player's selected selection is associated with a termination symbol or terminator, the bonus game ends. In this embodiment, if the player obtains a termination symbol or terminator, the player is awarded the sum total of all awards associated with prior selected highlighted selections. It should be appreciated that if a player obtains a termination symbol, the game may provide no award, provide the player the last highlighted award, provide the player a consolation award or select another award to provide the player.

In an alternative embodiment of the present invention, a player's prior selected highlighted selections may not remain highlighted during subsequent player selections. In this embodiment, after the player selects a selection, the gaming device may randomly unhighlight a plurality of the player's prior selected highlighted selections. In another embodiment, a plurality of the player's prior non-selected selections may become highlighted during subsequent player selections. In this embodiment, after the player selects a selection, the gaming device may randomly highlight a plurality of prior non-selected selections. In another embodiment, after the player selects a selection, the gaming device may randomly unhighlight a plurality of the player's prior selected highlighted selections and also randomly highlight a plurality of prior non-selected selections.

In one embodiment, the gaming device may incorporate an offer-acceptance feature by enabling the player to end the bonus scheme at any point and collect the offers associated with the current highlighted selections. In this embodiment, the player may end the bonus scheme and accept the awards associated with the current highlighted selections or the player may continue selecting selections. If the player continues selecting selections, the player risks that the awards associated with the subsequently highlighted selections total more than the awards associated with the current highlighted selections. This embodiment provides increased entertainment to the player because with every selection, the player is risking that prior obtained awards associated with prior selected highlighted selections will no longer be provided to the player.

In another embodiment incorporating an offer-acceptance feature, after the player has picked an initial selection, the gaming device may enable the player to accept an offer associated with the picked selection or pick another selection that is directly related to the prior picked selection. If the player accepts the offer associated with the picked selection, the player obtains the offer and bonus game ends.

In an alternative embodiment of the present invention, the gaming device provides a plurality of player picks of the selectable selections. In one embodiment, the number of player picks of the selectable selections is equal to the number of selection sets. For each selection selected by the player the number of player picks of selectable selections is reduced by one. In this embodiment, the player may continue selecting selectable selections until the player has no remaining player picks of selectable selections.

In another alternative embodiment of the present invention, in addition to the plurality of awards associated with the plurality of player selectable selections, a plurality of player pick modifiers are associated with the plurality of player selectable selections. In one embodiment, each player pick modifier increases the number of remaining player picks of the selectable selections. In another embodiment, each player pick modifier decreases the number of remaining player picks of the selectable selections. In a further embodiment, a plurality of modifiers that increase the number of picks remaining and a plurality of modifiers that decrease the number of picks remaining are both associated with the plurality of player selectable selections. This embodiment increases the player's enjoyment because each selection the player selects may either increase or decrease the number of picks of selectable selections the player may make and subsequently effect if the player will obtain another award. It should be appreciated that in this embodiment, if a player pick modifier is associated with a selected selection, the non-selected selections in that selection set are not spent or marked and may be selected in subsequent player selections.

It is therefore an advantage of the present invention to provide a gaming device having an adjacent selection bonus game.

Other objects, features and advantages of the invention will be apparent from the following detailed description taken in conjunction with the accompanying sheets of drawings wherein like numerals refer to like part, elements, components, steps and processes.

DETAILED DESCRIPTION OF THE INVENTION

Gaming Device and Electronics

Figure 1A:
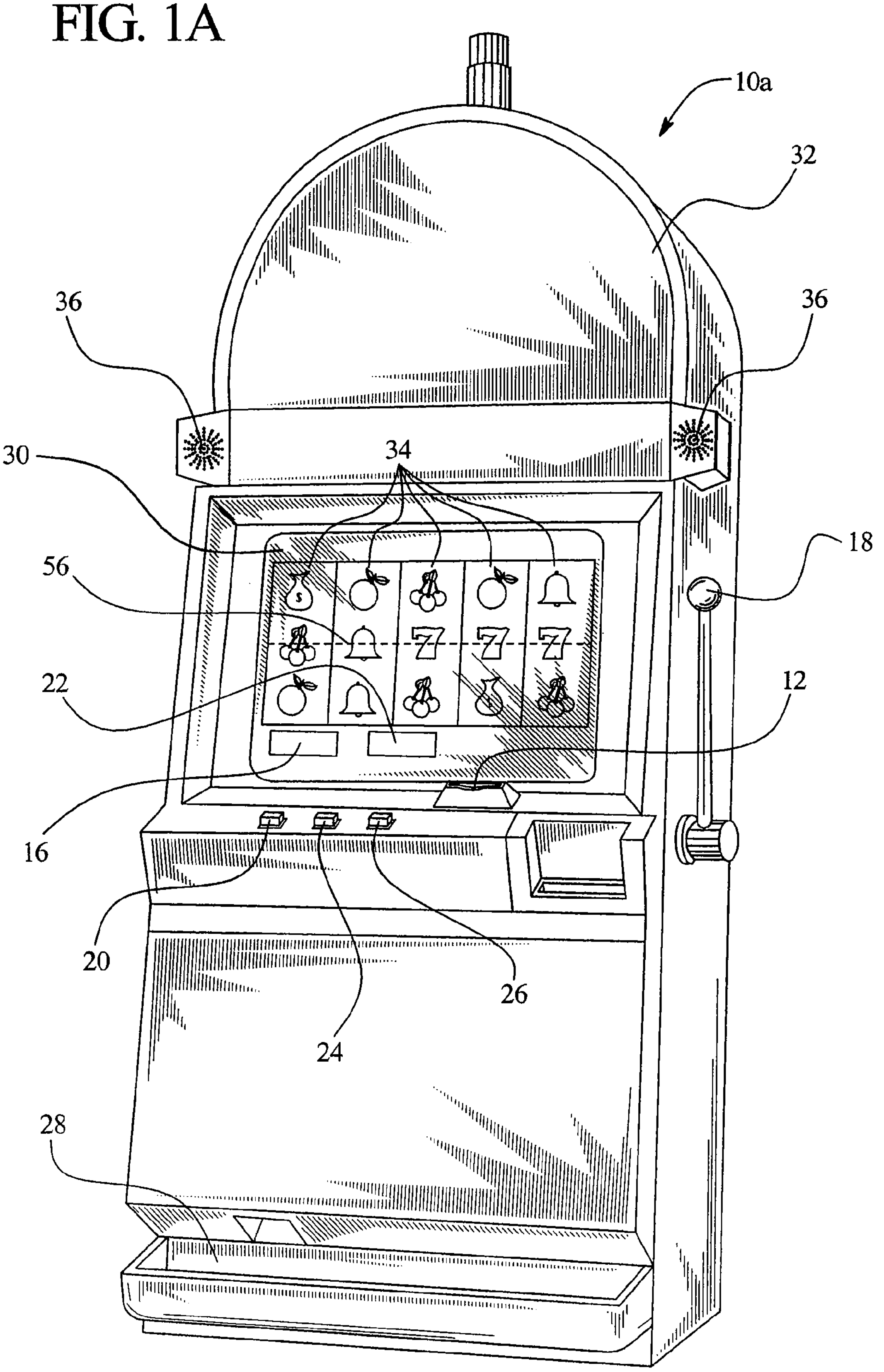
FIGS. 1A and 1B are perspective views of alternative embodiments of the gaming of the present invention.
Figure 1B:
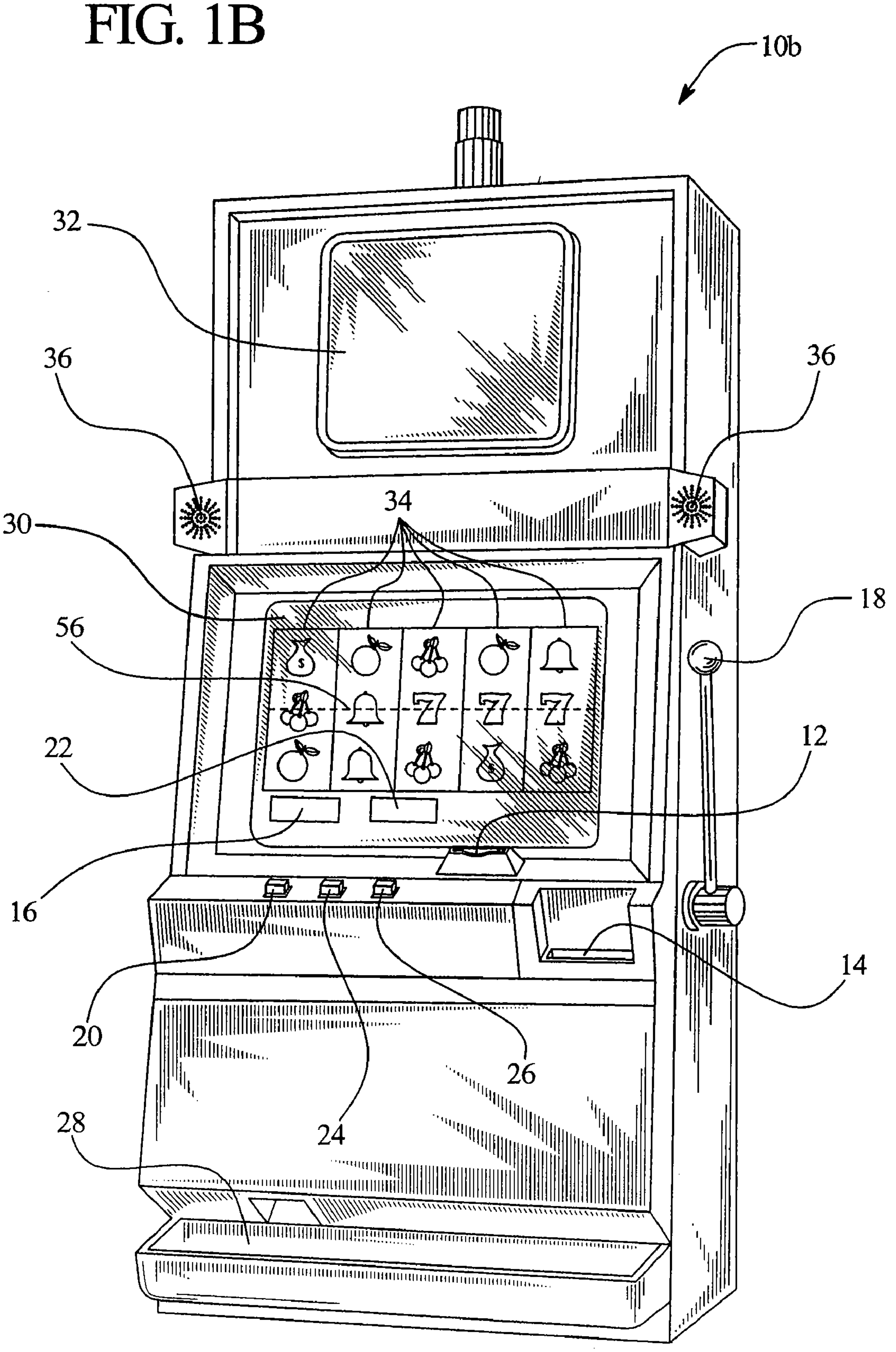

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
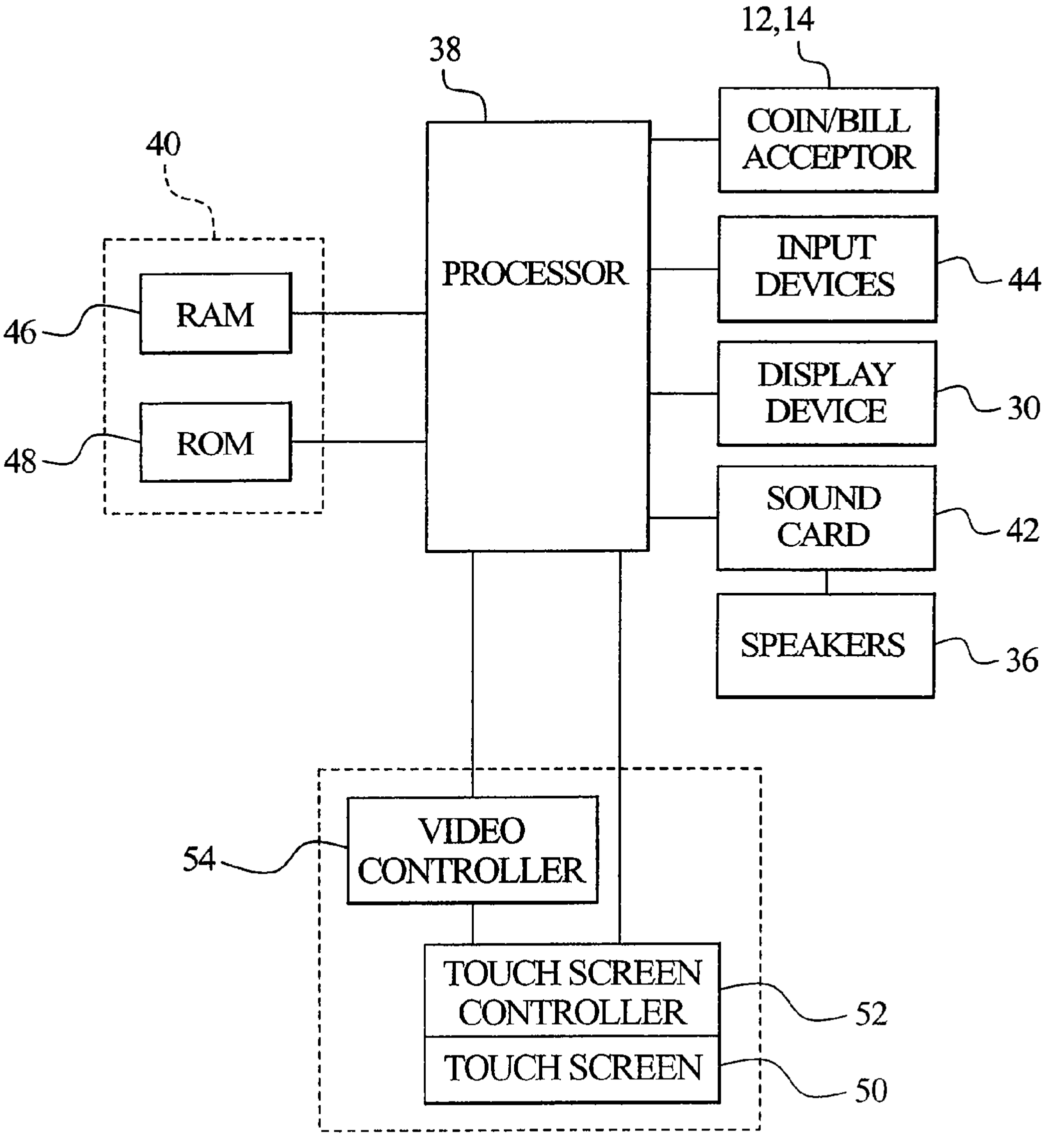
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the computer or controller.

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines displayed in a horizontal and/or diagonal fashion.

Bonus Game

Generally, one embodiment of the bonus game of the present invention provides a screen or display which is preferably a touch screen which enables the player to select adjacent selections to obtain bonus awards. It should be appreciated that the present invention could also be implemented as a primary game in a gaming machine. The game preferably provides a plurality of awards and a plurality of player selectable selections. An award or bonus award is associated with each player selectable selection. The award associated with each player selectable selection, such as a credit or dollar amount, is not initially revealed or displayed to the player.

The gaming device may randomly select the awards from a predetermined pool of awards (not shown). Alternatively, the gaming device may have multiple predetermined pools of awards (not shown) to select awards from. Alternatively, the gaming device may randomly select the awards from a predetermined range of awards. The award associated with each player selectable selection is preferably randomly determined at the beginning of each bonus round.

The number of possible awards may be greater than, less than or equal to the number of player selectable selections. In one embodiment, once an award amount is associated with a player selectable selection, that award amount may not be associated with another player selectable selection during a particular bonus round. In another embodiment, the same award amount may be associated with a plurality of player selectable selections in each bonus round.

The player selectable selections are arranged into a plurality of selection sets. In one embodiment, each selection set has a different number of player selectable selections. In another embodiment, a plurality of selection sets have the same number of player selectable selections. Each selection set is preferably related or associated with another selection set. In one embodiment, the selection sets are arranged adjacent to each other, thus allowing each player selectable selection to be adjacent to at least one player selectable selection from a related or associated selection set. In another embodiment, each selection set is related or associated with a plurality of other selection sets.

Upon the triggering of the bonus game, the gaming device enables a player to pick a selectable selection from an initial selection set. It should be appreciated that the player may select a selection by utilizing the touch screen or by any other suitable selector which communicates with the processor. The selector may be also a mechanical device. The selected selection is highlighted. The award associated with the player selected selection is revealed and provided to the player. After a selection has been selected from a selection set, the non-selected selections from that selection set become spent or marked and may no longer be selected by the player. Thus, the gaming device enables the player to select one selection from each selection set.

After the player has selected an initial selection, the gaming device enables the player to select another selection from a selection set that is adjacent or otherwise directly related to the last selected selection. In an alternative embodiment, selections in the same selection set as the last selected selection may be selected. It should be appreciated that by enabling the player to only select selections from a related selection set that are adjacent or otherwise related to the last selected selection, with every selection, the player is eliminating the possibility of obtaining awards associated with a number of selectable selections in subsequent directly related or indirectly related selection sets. In this embodiment, the selected selection is highlighted and the award associated with the selected selection is revealed and provided to the player. The non-selected selections from the second selection set become spent or marked and cannot be selected by the player in subsequent selections as described above.

If the player has not selected one selection from each selection set, the gaming device enables the player to select another selection that is in a selection set adjacent or related to the last selected selection and the bonus game proceeds as described above. If the player has selected one selection from each selection set, the player is awarded the sum total of the awards associated with all the selected selections and the bonus game ends. In an alternative embodiment, the game does not reveal the award associated with each selected selection as each selection is selected. Rather, the game highlights the selected selection and when the player has selected one selection from each selection set, the gaming device reveals and provides the player the awards associated with all of the prior selected highlighted selections. In an alternative embodiment, as each subsequent selected selection is highlighted, the gaming device reveals the award associated with prior selected selections from previous selection sets. In another embodiment, the gaming device also reveals the awards associated with all the potential player selectable selections.

It should be appreciated that the adjacent selection feature of the present invention functions to eliminate a plurality of selectable selections from being selected by the player in subsequent selection sets. This feature allows for each player selection to have an impact on what selections may be available to be selected in subsequent selection sets. The adjacent selection feature increases the player's entertainment because after the awards associated with the selectable selections are revealed, the player can retrace their selections and determine which prior selections they should have or should not have selected.

Figure 3A:
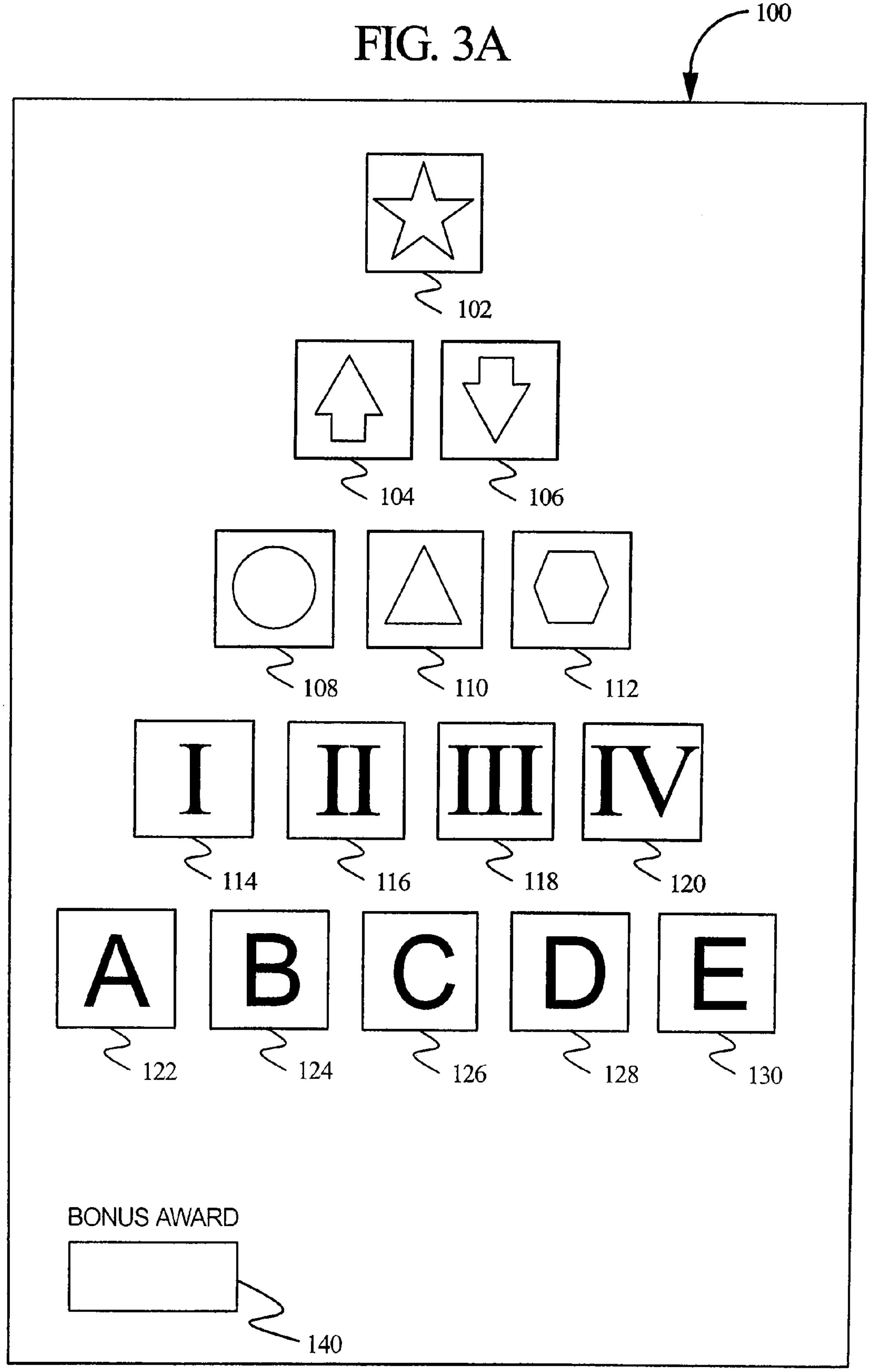
FIGS. 3A through 3G are front elevation views of the bonus award selection screen of one embodiment of the present invention, and illustrating an example of a plurality of selections which the player may select a plurality of adjacent selections in related selection sets to obtain bonus awards.

Referring now specifically to FIGS. 3A through 3G, the embodiment including the highlighting of selected selections of the present invention is described and illustrated. The gaming device provides a screen or display 100 which is preferably a touch screen which enables the player to select adjacent selections to obtain a bonus award. As seen in FIG. 3A, there are fifteen player selectable selections 102 through 130. An award is associated with each player selectable selection. The player selectable selections are arranged into five selection sets which are respectively designated by the star set, the arrow set, the shape set, the Roman numeral set, and the letter set. In this embodiment, the five selection sets are arranged in a pyramid configuration, however, any configuration which enables the plurality of selection sets to be related or adjacent to each other is contemplated by the present invention. In this embodiment, each row of the pyramid represents a different selection set. Each set includes at least one player selectable selection. In this embodiment, each set includes a different number of player selectable selections.

More specifically, the first set or top row of the pyramid has one selection 102 which is labeled as a star symbol. The second set or second row from the top of the pyramid has two selections 104 and 106 labeled as up and down arrows, respectively. The third set or third row from the top of the pyramid has three selections 108, 110 and 112 labeled as a circle symbol, a triangle symbol and a hexagon symbol, respectively. The fourth set or fourth row from the top of the pyramid has four selections 114, 116, 118 and 120 labeled as roman numerals I, II, III and IV, respectively. The fifth set or bottom row of the pyramid has five selections 122, 124, 126, 128 and 130 labeled A, B, C, D and E, respectively. It should be appreciated that the different symbol themes (such as letters or roman numerals) are used to illustrate the different selection sets and it is contemplated that all player selectable selections may have uniform symbols. It should also be appreciated that each selection could simply be a blank symbol.

Figure 3B:
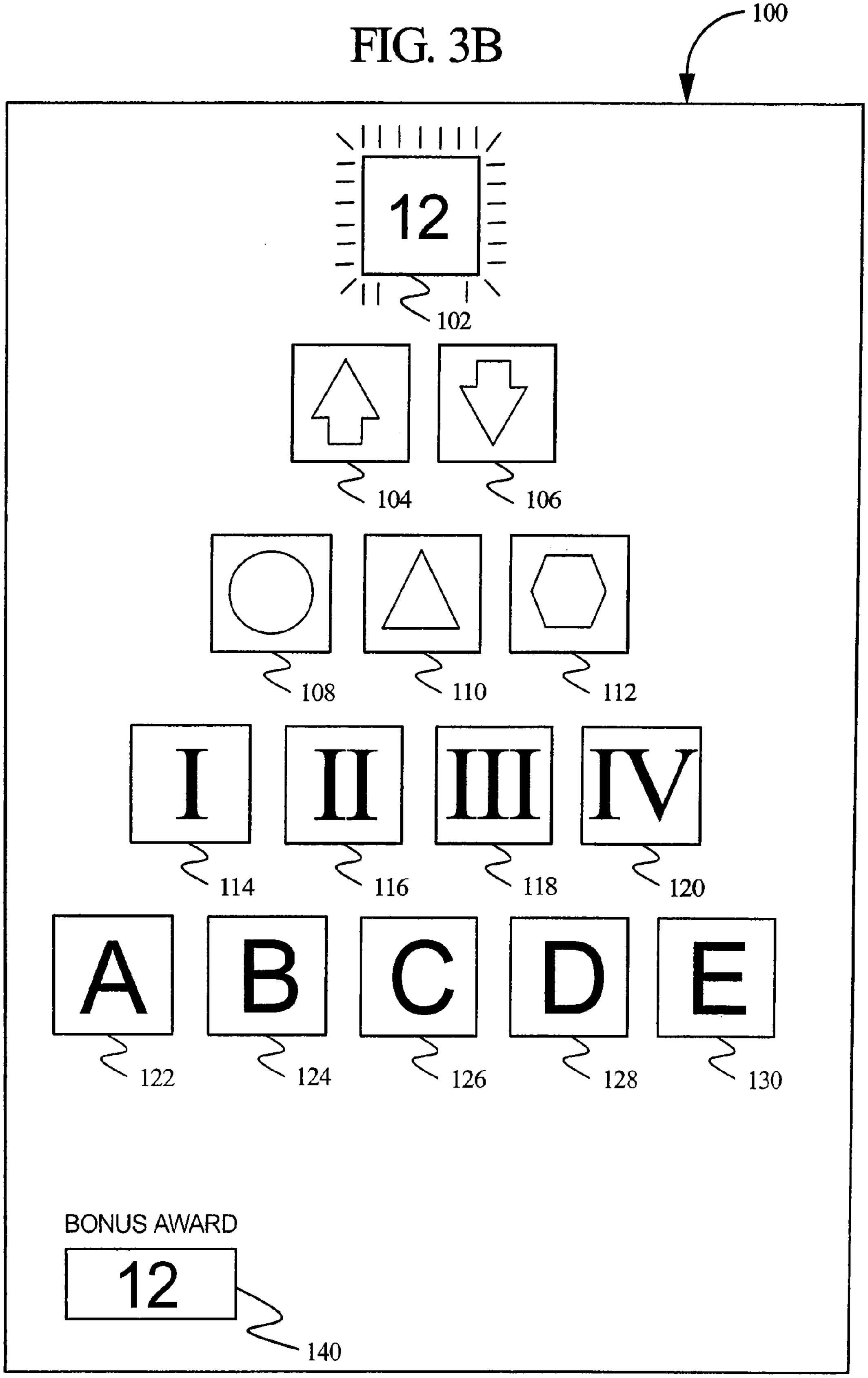

As illustrated in FIG. 3B, upon the initiation of the bonus scheme, the gaming device enables the player to choose one selection from the first selection set. As the first selection set has one player selectable selection 102, the player must select the one selection 102 from this set. It should be appreciated that a set with only one selection requires the player to select that selection and does not limit subsequent selections. As illustrated in FIG. 3B, once selected, the selection becomes highlighted and the award of twelve associated with selection 102 is revealed and provided to the player. The award amount is displayed in the bonus award display 140. It should be appreciated that the starting position could be pre-selected or randomly selected. It should also be appreciated that in the alternative embodiment described above, once the player selects a selection, the selected selection is highlighted but not immediately revealed to the player. In this embodiment, once a selection is highlighted, that selection remains highlighted during subsequent player selections.

Figure 3C:
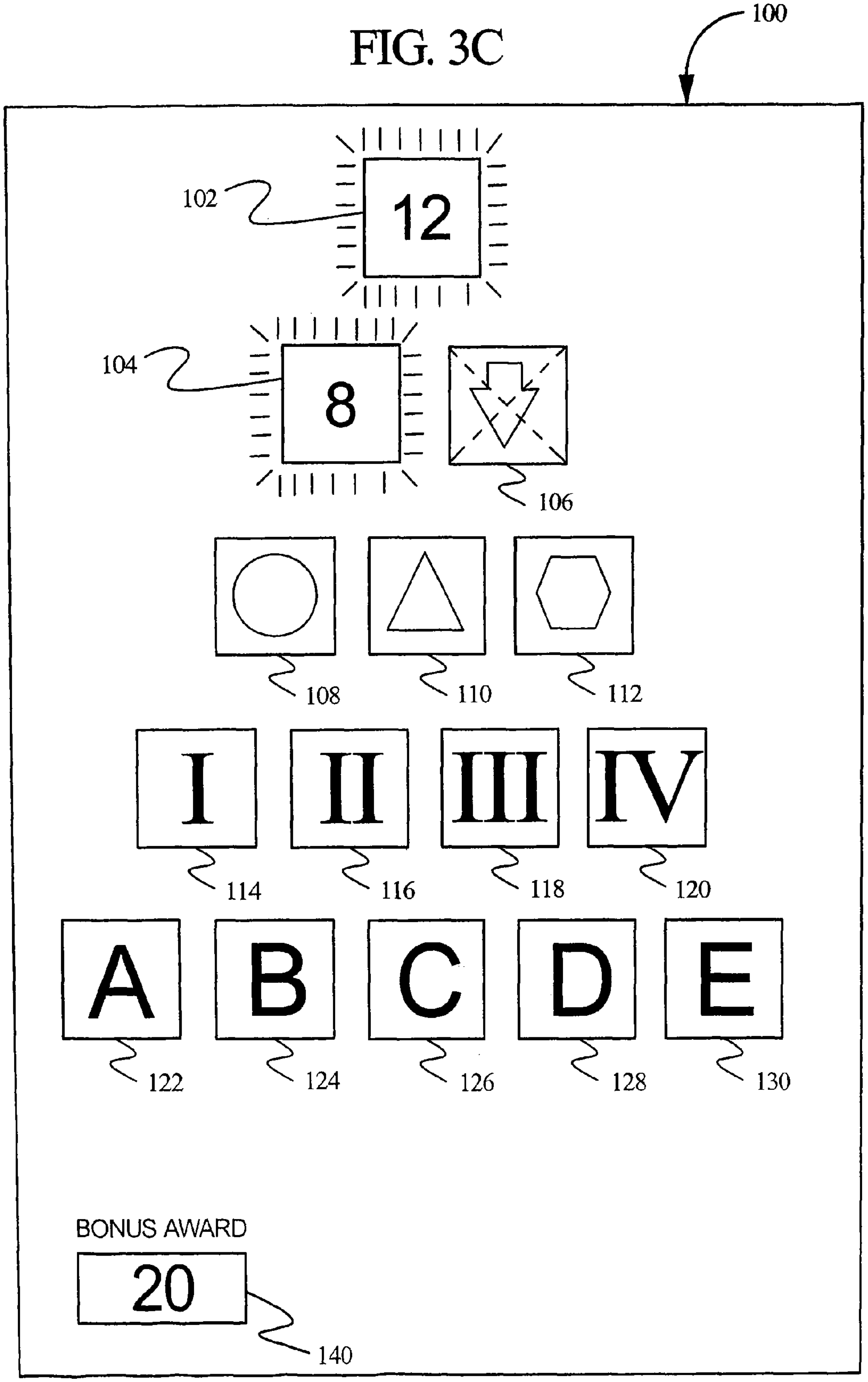

As illustrated in FIG. 3B, since the player has not selected one selection from each selection set, the gaming device enables the player to select another selection from the second selection set that is adjacent or otherwise related to the prior selected highlighted selection 102. As illustrated in FIG. 3C, the player selects selection 104. Selection 104 is highlighted and the award of eight associated with selection 104 is revealed and provided to the player. The new bonus award of twenty (representing a combination of the prior bonus award of twelve and the award of eight associated with selection 104) is displayed in the bonus award display 140. Additionally, the non-selected selection 106 in the same selection set as selection 104 becomes spent or marked and may no longer be selected in subsequent player selections, as indicated by the X in phantom through selection 106.

Figure 3D:
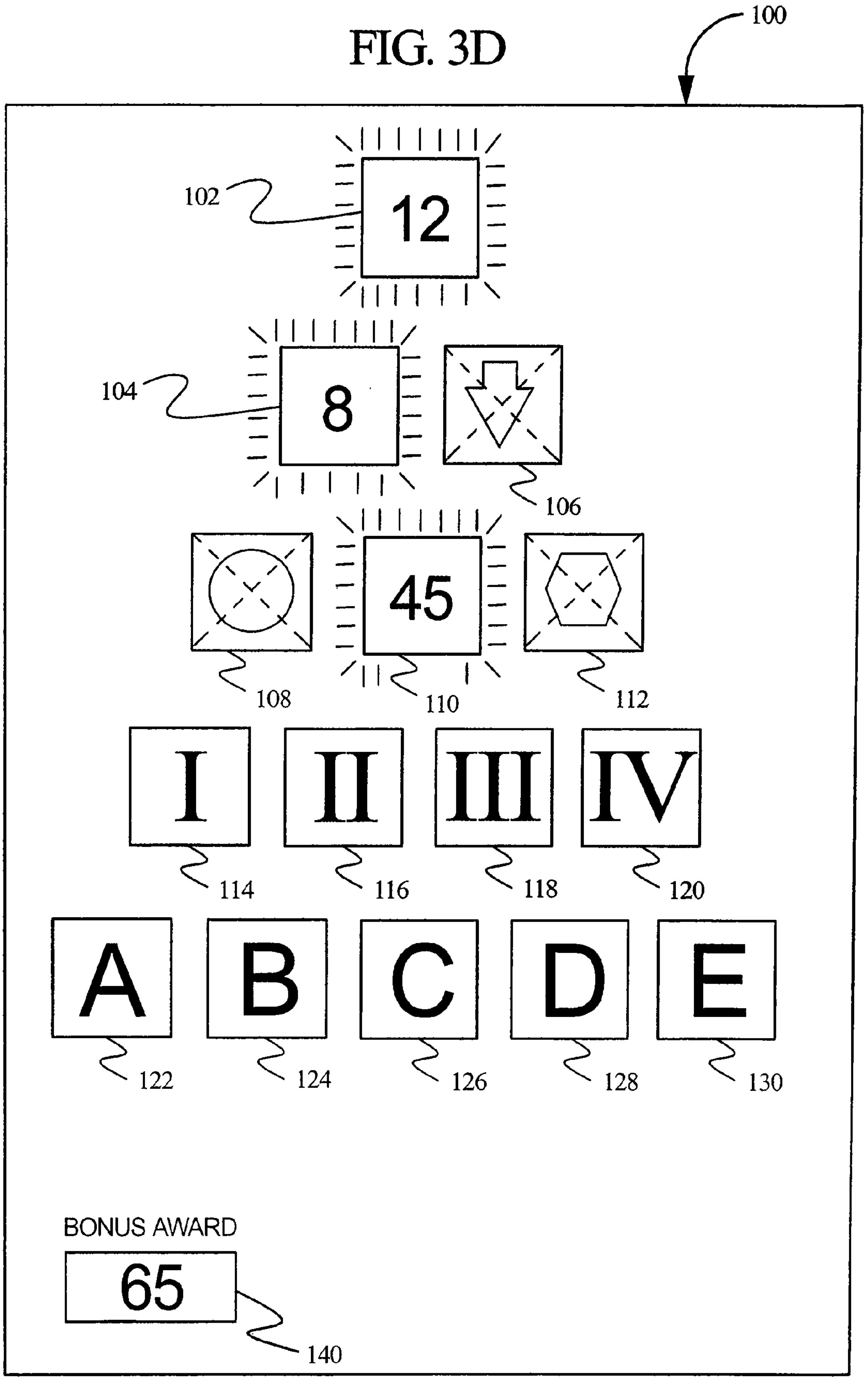

Referring to FIG. 3D, since the player has not selected one selection from each selection set, the gaming device enables the player to select another selection from the next selection set that is adjacent or otherwise related to the prior selected highlighted selection. It is important to note here that because the player selected selection 104 in the previous set, the player can only select selections 108 or 110. The player cannot select selection 112 because it is not related or adjacent to selected selection 104. Thus, the player's selection in the second set determines the player's possible sections in the third selection set. In this embodiment, the player's pick of selection 104 also determines the available selections in the Roman numeral or fourth selection set and the letter or fifth selection set. Specifically, because the player picked selection 104, the player eliminated the possibility of picking: (a) selection 112 (in a directly related selection set) which is not related to selection 104; (b) selection 120 (in an indirectly related selection set) which is only related to selection 112; and (c) selection 130 (in an indirectly related selection set) which is only related to selection 120. It should thus be appreciated that each selection (except in the last selection set) limits the player's possible selections in one or more subsequent sets.

Returning to the example, the player's next selection is selection 110. Selection 110 is highlighted and the award of forty-five associated with selection 110 is revealed and provided to the player. The new bonus award of sixty-five is displayed in the bonus award display 140. As described above, the non-selected selections in the same selection set as selection 110, become spent or marked and may no longer be selected in subsequent player selections, as indicated by the X in phantom through selections 108 and 112. It should be appreciated that the prior spent non-selected selections remain spent for subsequent player selections, as indicated by the X in phantom through selection 106.

Figure 3E:
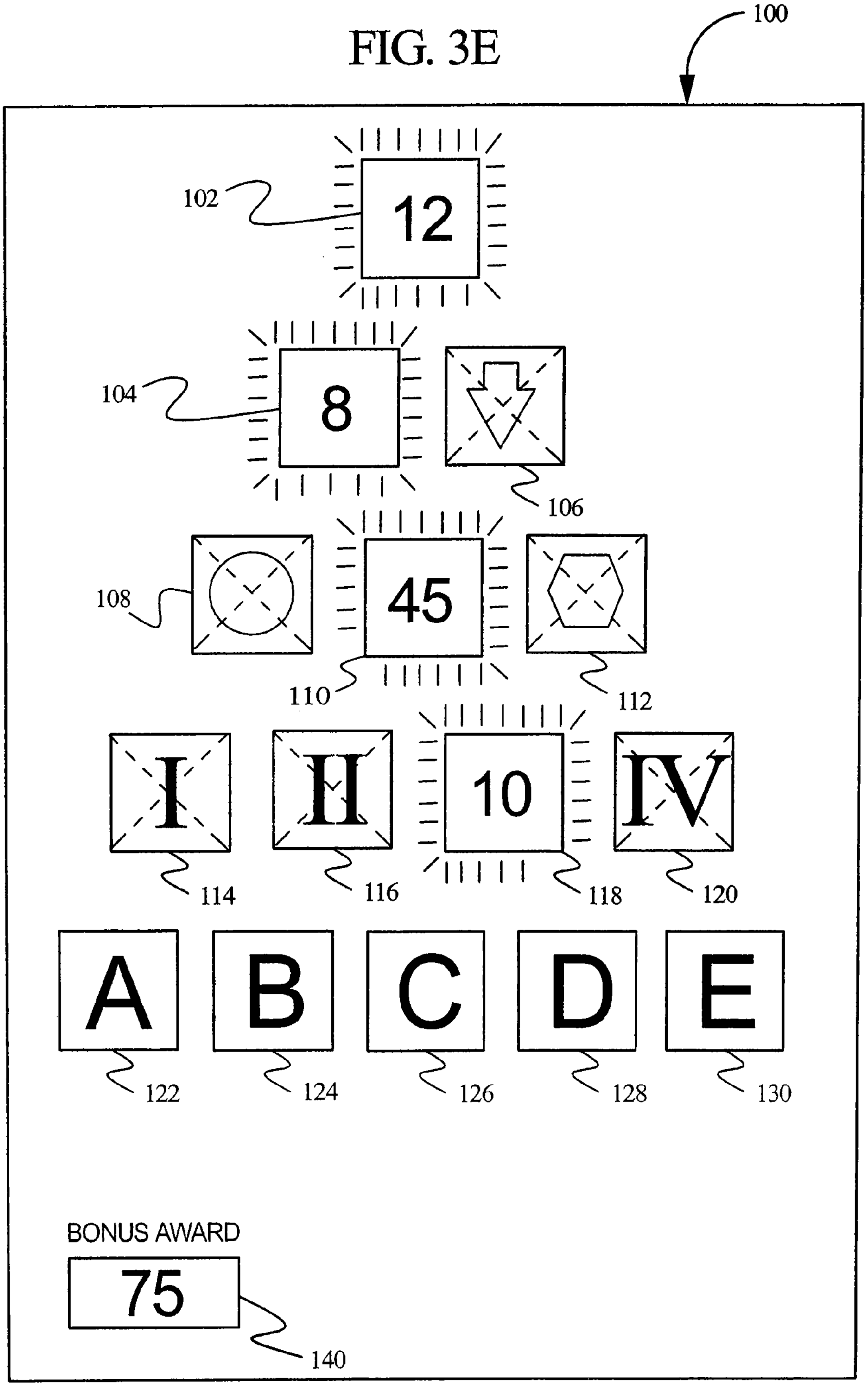

Since the player has not selected one selection from each selection set, the gaming device enables the player to select another selection that is adjacent or otherwise related to the prior selected highlighted selection. As described above, selections 114 and 120 are not adjacent to the prior selected highlighted selection 110, and thus it is impossible for the player to select selections 114 or 120 with the player's next pick. It should also be appreciated as described above, the player's pick of selection 110 eliminates the possibility that the player can pick selection 122 because selection 122 is only related to section 114. The player's next selection is selection 118 as illustrated in FIG. 3E. Selection 118 is highlighted and the award of ten associated with selection 118 is revealed and provided to the player. The new bonus award of seventy-five is displayed in the bonus award display 140. As further described above, the non-selected selections in the same selection set as selection 118, become spent or marked and may no longer be selected in subsequent player selections, as indicated by the X in phantom through selections 114, 116 and 120.

Figure 3F:
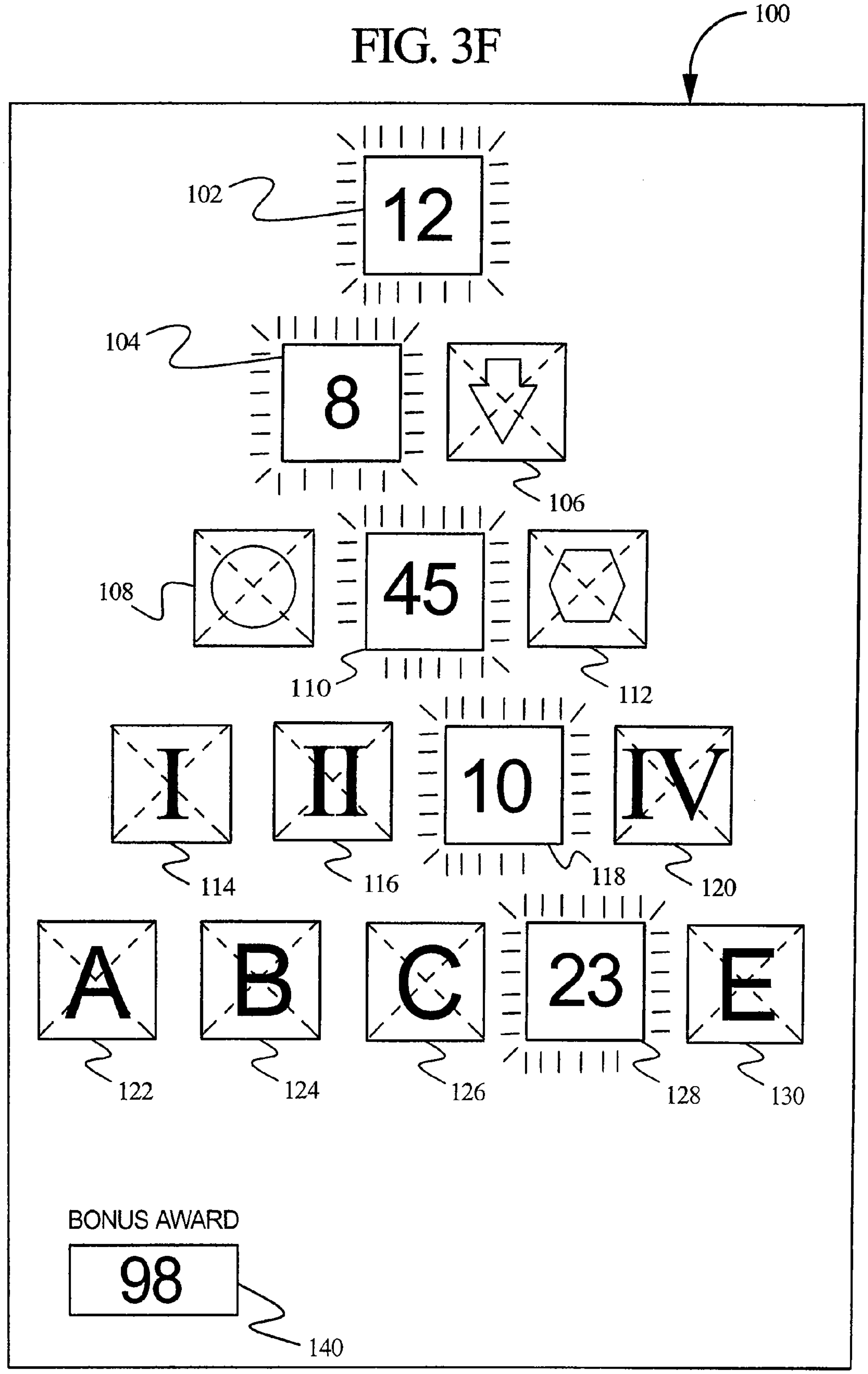

Referring to FIG. 3F, since the player has not selected one selection from each selection set, the gaming device enables the player to select another selection that is adjacent or otherwise related to the prior selected highlighted selection. As described above selections 122, 124 and 130 are not adjacent to the prior selected highlighted selection 118, thus it is impossible for the player to select selections 122, 124 or 130 with their selection pick. The player's next selection is selection 128. Selection 128 is highlighted and the award of twenty-three associated with selection 128 is revealed and provided to the player. The new bonus award of ninety-eight is displayed in the bonus award display 140. As further described above, the non-selected selections in the same selection set as selection 128, become spent or marked and may no longer be selected in subsequent player selections, as indicated by the X in phantom through selections 122, 124, 126 and 130.

Figure 3G:
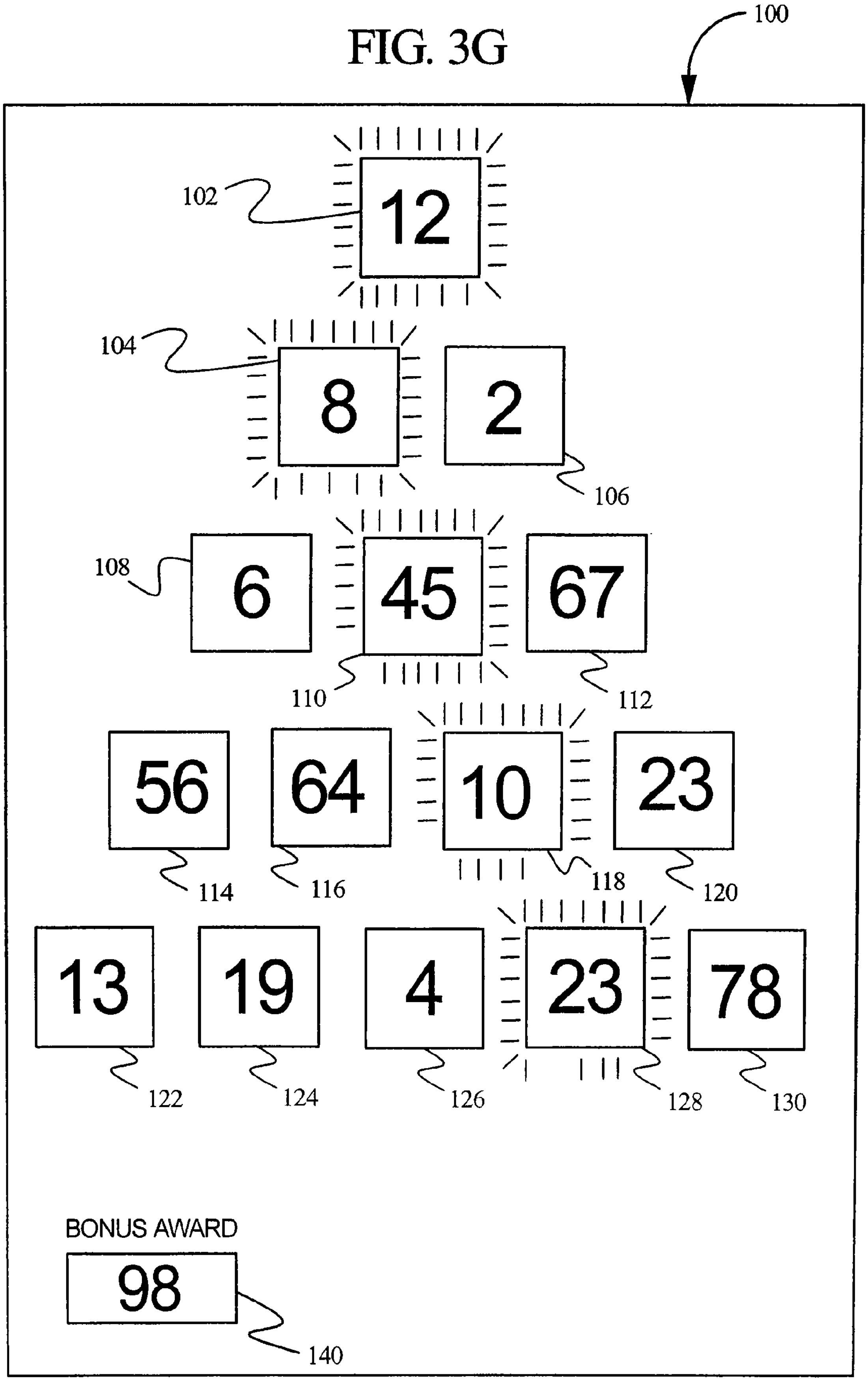

Since the player has selected one selection from each selection set, the player receives the provided bonus award of ninety-eight credits and the bonus game terminates. In an alternative embodiment as shown in FIG. 3G, the gaming device reveals the awards associated with each non-selected selection. It should be appreciated that the player could have more than one selection in a set, and that the player could simply have one selection in each set.

In an alternative embodiment of the present invention, the player may select their initial selection from the fifth selection set or bottom row of the pyramid and proceed to select selections in related selection sets that are adjacent or otherwise related to the prior selected highlighted selection. In this embodiment, as the non-selected selections from each selection set become spent or marked and can no longer be selected by the player the player's subsequent selections must be from the fourth selection set, then the third selection set, then the second selection set and finally the first selection set or top row of the pyramid. In another embodiment, the player may select their initial selection from any selection set. In this embodiment, the player's subsequent selections must still be adjacent to the prior selected highlighted selection. For example, if the player's initial selection was selection 110 from the third selection set, the players next selection must be either selection 104 or 106 from the second selection set or selection 116 or 118 from the fourth selection set. In this embodiment, certain selection sets thus have more than one or multiple related selection sets. In an alternative embodiment, once a player selects a selection from one selection set, each subsequent selection must be directly related to the prior selection set.

In an alternative embodiment of the present invention, the gaming device incorporates an offer acceptance feature. In this embodiment, with each player pick of a selectable selection, the player is given the choice of either accepting the award associated with the player picked selection or selecting another selection that is related to the prior selected selection. If the player accepts the award associated with the player picked selection, the player obtains the associated award and the bonus game ends. If the player chooses to select another selection, then as described above, the player can only select another selection that is directly related to the prior selected selection. The bonus game of this embodiment continues until either the player has accepted an award associated with a picked selection or the player has selected one selection from each selection set, in which case the player obtains the award associated with the last selected selection and the bonus game ends.

In an alternative embodiment of the present invention, the gaming device provides at least one termination symbol or terminator. In another embodiment, the gaming device provides a plurality of termination symbols or terminators. The termination symbols or terminators are associated with a plurality of player selectable selections. In this embodiment, the bonus game proceeds as described above, and if the player's selected selection is associated with a termination symbol or terminator, the bonus game ends. It should also be appreciated that the players selections can, as described above, limit the selections in subsequent sets and thus limit or not limit the probability of selecting the selection with the terminator. Accordingly, with each selection, the probability of obtaining the terminator may increase, decrease or remain the same. If the player obtains a termination symbol or terminator, the player is awarded the sum total of all awards associated with prior selected selections. It should be appreciated that in this embodiment, the bonus game ends when either the player selects a selection with an associated termination symbol or terminator or when the player has selected one selection from each selection set. Additionally, in this embodiment, as the player selects each selection, the award associated with the selected selection is revealed to the player. In an alternative embodiment, as the player selects each selection, the award associated with the selected selection as well as the award associated with the non-selected spent selections from that selection set are revealed to the player. The highlighting selection embodiment may also be employed.

It should be appreciated that the player's entertainment is increased by associating a plurality of termination symbols or terminators with the plurality of selectable selections. Adding an element of danger that the game may end at any time increases the player's level of enjoyment in playing the game.

Figure 4A:
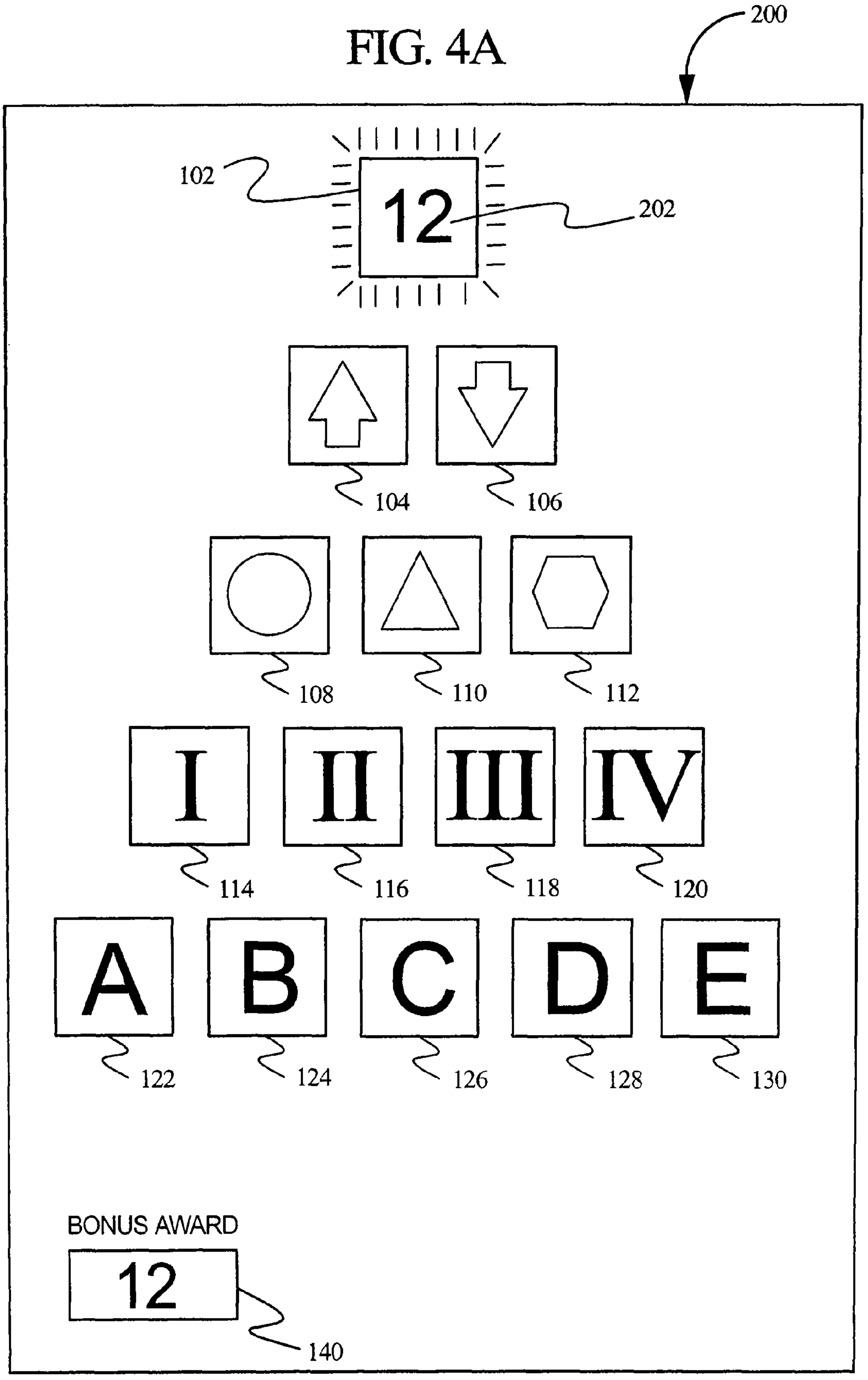
FIGS. 4A through 4C are front elevation views of the an alternative embodiment of the present invention, and illustrating an example of a terminator associated with one of the selections.

As illustrated in FIG. 4A, in an alternative embodiment of the present invention, the gaming device provides a screen or display 200 which enables the player to obtain a bonus award. Upon the triggering of the bonus game, the gaming device enables the player to select an initial selection from an initial selection set. The player's initial selection is selection 102. The selected selection's associated award 202 of twelve is revealed and provided the player. The bonus award is indicated in the bonus amount display 140.

Figure 4B:
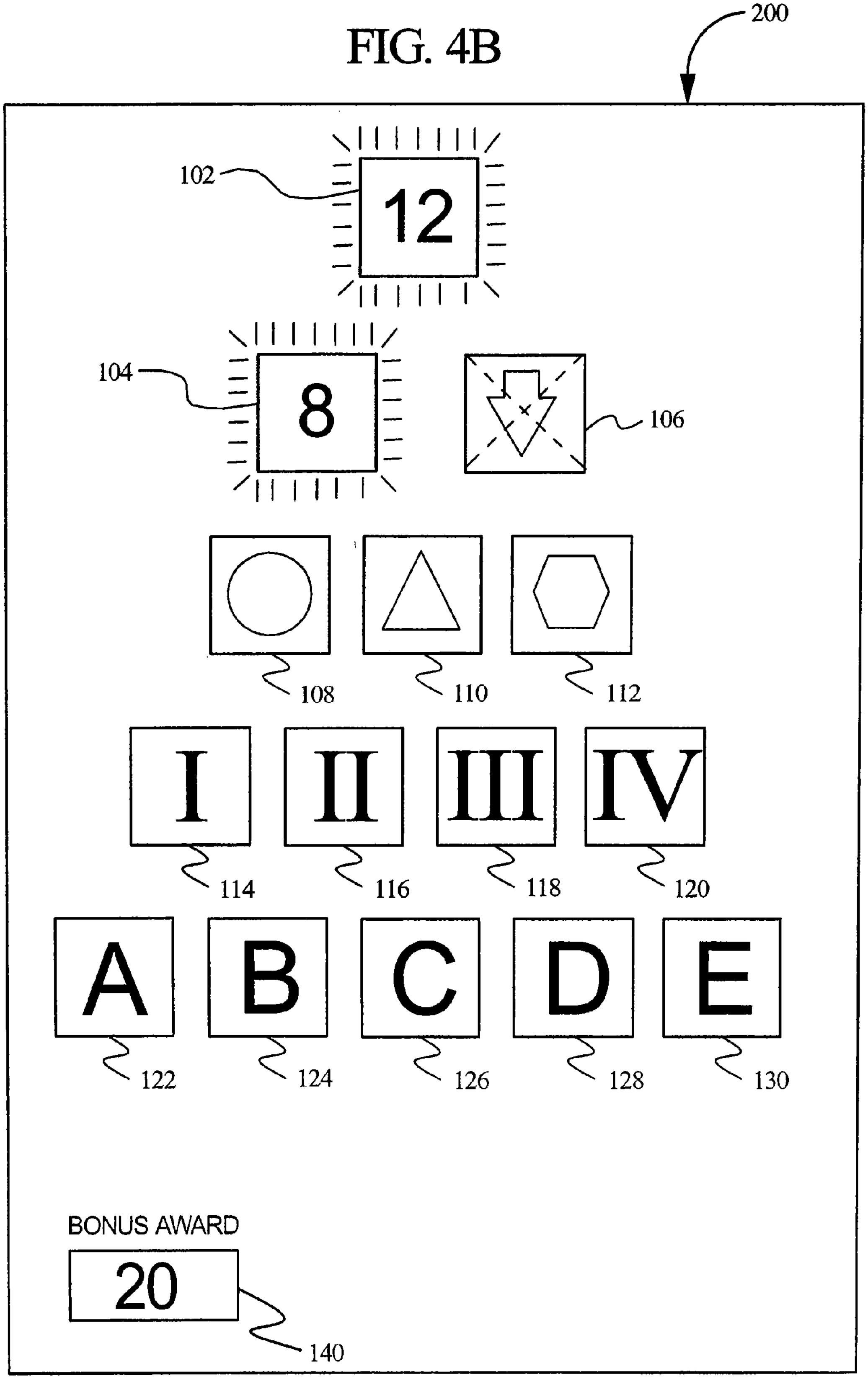

Referring now to FIG. 4B, since the player did not select a selection with an associated termination symbol or terminator and since the player has not selected one selection from each selection set, the gaming device enables the player to select another selection that is adjacent or otherwise related to the prior selected revealed selection. As seen in FIG. 4B, the player selects selection 104 with an associated award of eight is revealed to the player. The bonus amount display 140 indicates the new bonus award amount of twenty (representing the sum of the prior revealed award of twelve and the award of eight associated with the selection 104). It should be appreciated that as described in the above embodiment, the non-selected selections in the same selection set as selection 104, become spent or marked and may no longer be selected in subsequent player selections, as indicated by the X in phantom through selection 106.

Figure 4C:
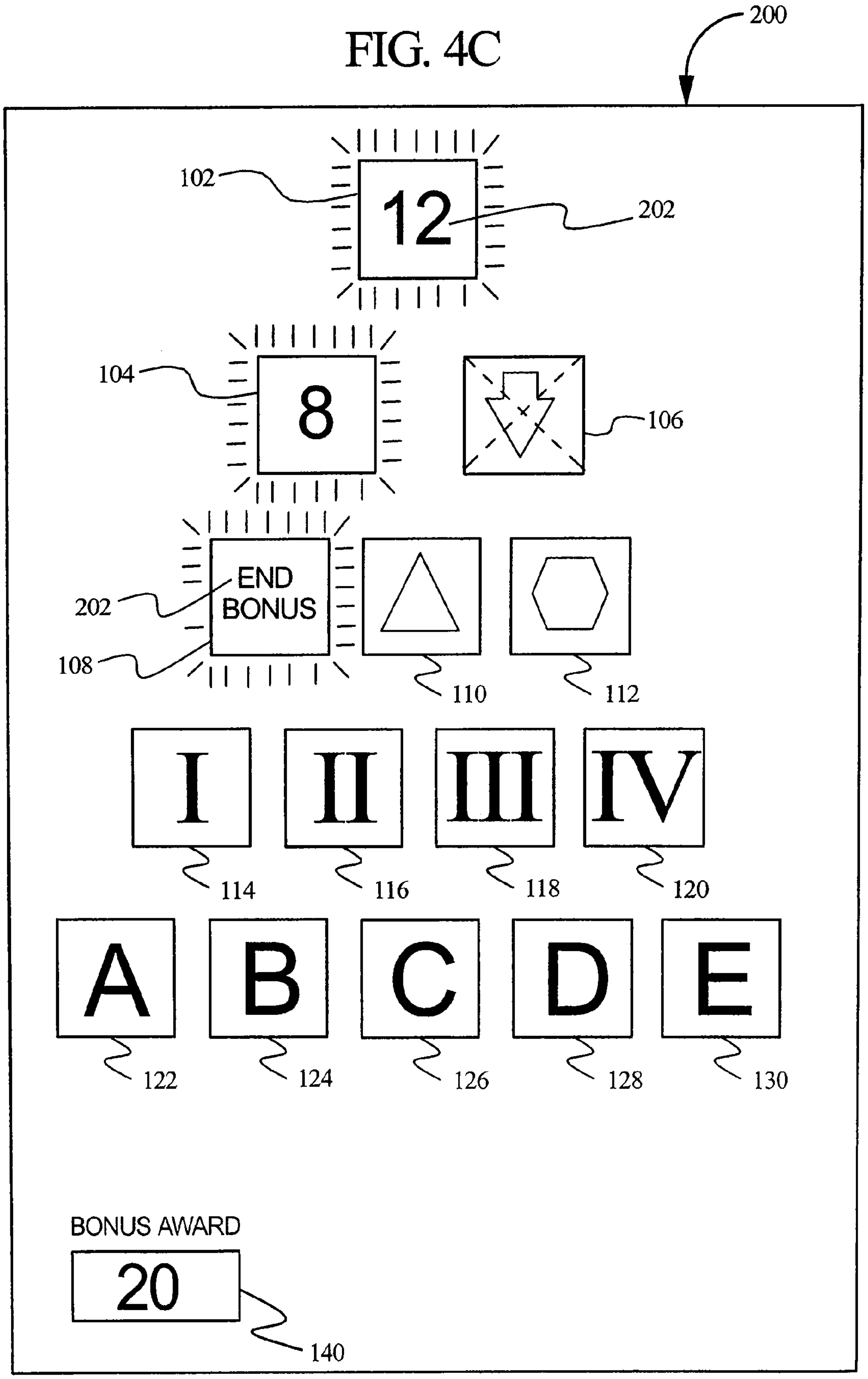

Referring now to FIG. 4C, since the player did not select a selection with an associated termination symbol or terminator and since the player has not selected one selection from each selection set, the gaming device enables the player to select another selection that is adjacent or otherwise related to the prior selected revealed selection. The player selects selection 108 which is associated with a termination symbol or terminator 202. The termination symbol or terminator 202 is revealed to the player and the bonus game ends. In this embodiment, if the player obtains a termination symbol or terminator 202, the gaming device provides the player the sum total of all the selected revealed selections (i.e., the amount displayed in the bonus display indicator 140). In alternative embodiments, if a player obtains a termination symbol or terminator 202, the gaming device will provide no award, provide the player the last revealed award, provide the player a consolation award or select another award to provide the player.

An alternative embodiment of the present invention incorporates an additional feature which modifies the prior selected and non-selected selections. In one embodiment, a player's prior selected highlighted selections may not remain highlighted during subsequent player selections. In this embodiment, after the player selects a selection, the gaming device may randomly unhighlight the player's prior selected highlighted selections. In another embodiment, non-selected selections may become highlighted during subsequent player selections. In this embodiment, after the player selects a selection, the gaming device may randomly highlight non-selected selections. The embodiment described in FIGS. 5A through 5C incorporate both these features into a single embodiment, by unhighlighting prior highlighted selections and highlighting prior non-selected selections.

In this embodiment, after the player selects each selection, the gaming device may randomly unhighlight the player's prior selected highlighted selections as well as randomly highlighting prior non-selected selections. This embodiment incorporates an offer-acceptance feature into the present invention. In this embodiment, the player may end the bonus game at any point and collect the awards associated with the current highlighted selections. The player may either end the bonus game and accept the awards associated with the current highlighted selections or continue selecting selections. This embodiment provides increased entertainment to the player because with every selection, the player is risking that the awards associated with prior selected highlighted selections will no longer be provided to the player. It should be appreciated that in an alternative embodiment, the gaming device does not enable the player to accept the current highlighted selections by the ending the bonus game. In this embodiment, when the player has selected one selection from each selection set, the player obtains the awards associated with the currently highlighted selections. In this embodiment, after the player selects each selection, the gaming device may randomly unhighlight the player's prior selected highlighted selections as well as randomly highlighting prior non-selected selections. This embodiment incorporates an offer-acceptance feature into the present invention. In this embodiment, the player may end the bonus game at any point and collect the awards associated with the current highlighted selections. The player may either end the bonus game and accept the awards associated with the current highlighted selections or continue selecting selections. This embodiment provides increased entertainment to the player because with every selection, the player is risking that the awards associated with prior selected highlighted selections will no longer be provided to the player. It should be appreciated that in an alternative embodiment, the gaming device does not enable the player to accept the current highlighted selections to end the bonus game. In this embodiment, when the player has selected one selection from each selection set, the bonus game ends and the player obtains the awards associated with the currently highlighted selections.

Figure 5A:
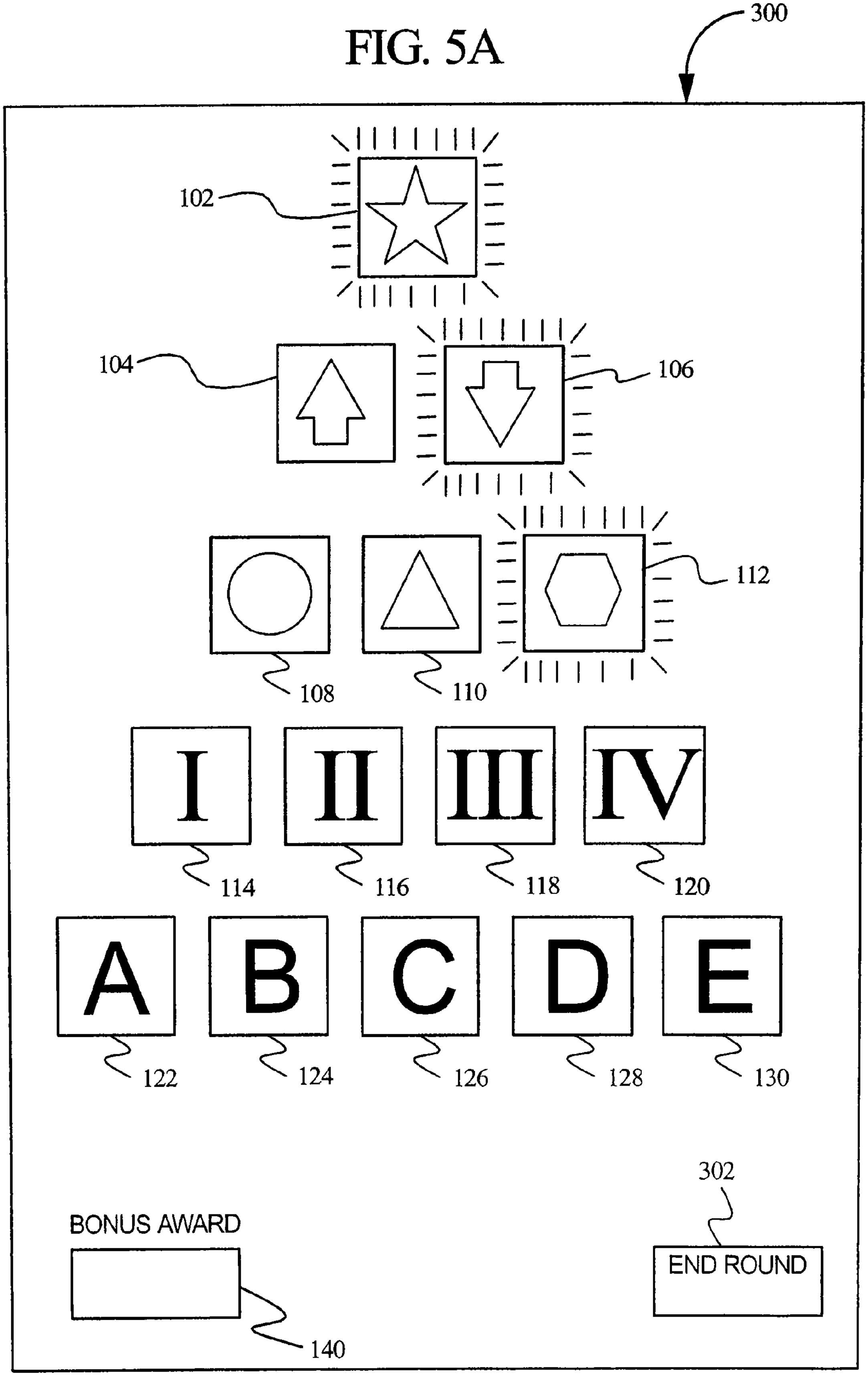
FIGS. 5A through 5C are front elevation views of an alternative embodiment of the present invention, and illustrating an example of award associated with highlighted selections being accepted or rejected.
Figure 5B:
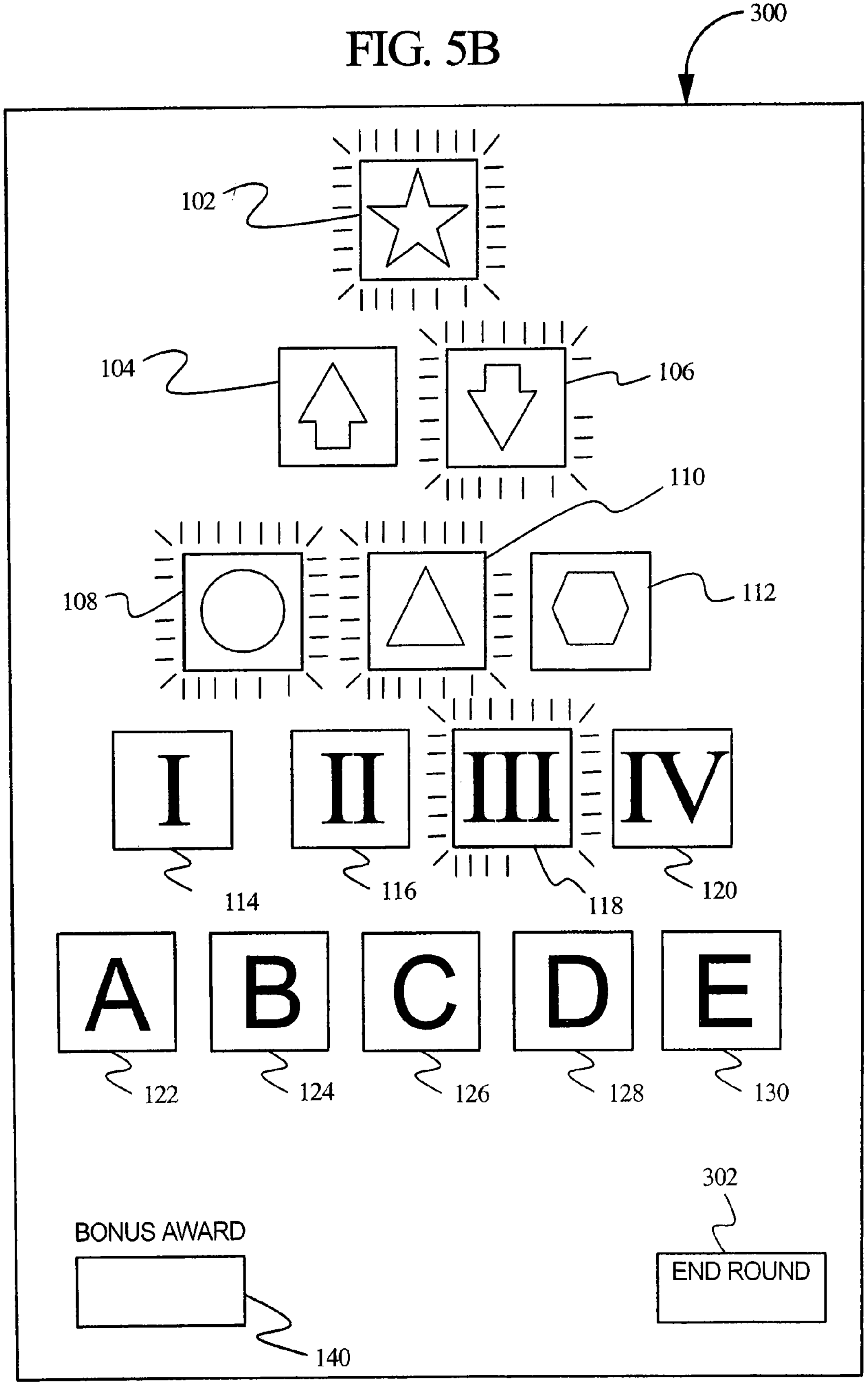
Figure 5C:
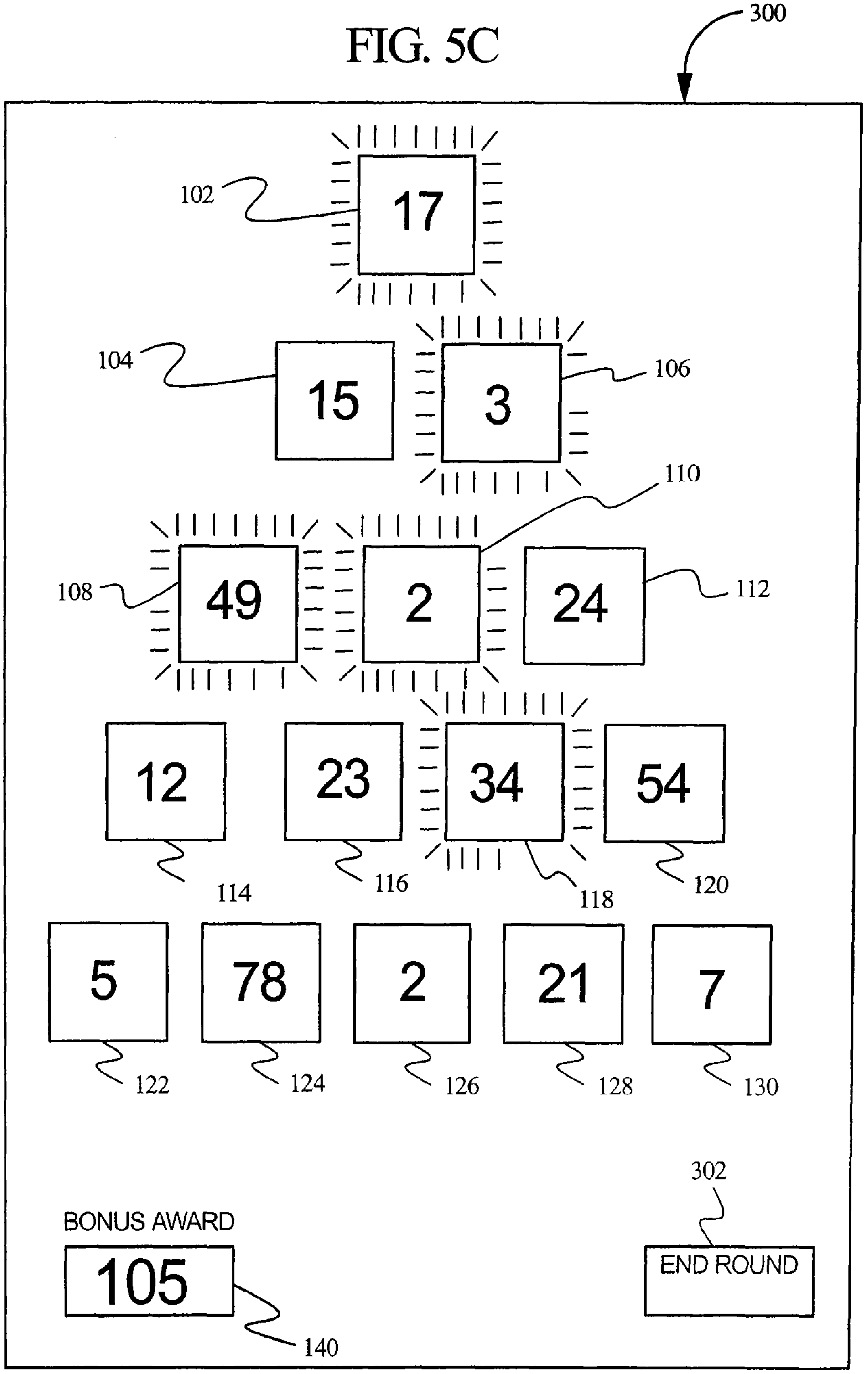

FIG. 5A illustrates this alternative embodiment of the present invention already in progress. As seen in FIG. 5A, the player has already selected three adjacent selections 102, 106 and 112. Accordingly, three prior selected selections 102, 106 and 112 are highlighted on the display 300. This embodiment includes an accept current highlighted selections indicator 302 which enables the player to end the bonus game at any time and obtain the awards associated with the current highlighted selections. As seen in FIG. 5B, the player's fourth selection was selection 118 which was subsequently highlighted. After the player's selection, the gaming device unhighlighted prior highlighted selection 112 and highlighted the non-selected spent selections 108 and 110. As illustrated in FIG. 5C, using the accept current highlighted selections indicator 302, the player chose to end the bonus game and obtain the award associated with the current highlighted selections. Accordingly, the player obtains an award of one hundred five credits as indicated in the bonus award display 140. This bonus award represents the sum total of all the awards associated with all the currently highlighted selections. As seen in FIG. 5C, the awards associated with the highlighted selections 102, 106, 108, 110 and 118 are seventeen, three, forty-nine, two and thirty-four, respectively, to total one hundred five credits. As further illustrated in FIG. 5C, the awards associated with all the selectable selections are revealed to the player.

In an alternative embodiment of the present invention, the gaming device provides a number of player picks of the player selectable selections. In one embodiment, the number of player picks of the player selectable selections is equal to the number of selection sets. In another embodiment, the number of player picks is less than the number of selection sets. The number of player picks may be pre-determined, randomly determined, based on the bonus triggering event, based on the player's wager or otherwise suitably determined. In this embodiment, for each selection selected by the player the number of player picks of selectable selections is reduced by one. In this embodiment, the player may continue selecting selectable selections until the player has no remaining picks of selectable selections. If the player has no remaining picks of selectable selections, the player obtains the sum total of the awards associated with all the selected selections and the bonus game ends.

In an alternative embodiment of the present invention, in addition to the plurality of awards associated with the plurality of player selectable selections, a plurality of player pick modifiers are associated with the plurality of player selectable selections. In this embodiment, the gaming device provides a number of player picks of the player selectable selections. In one embodiment, each player pick modifier increases the number of remaining player picks of the selectable selections. In another embodiment, each player pick modifier decreases the number of remaining player picks of the selectable selections. In a further embodiment, a plurality of modifiers that increase the number of picks remaining and a plurality of modifiers that decrease the number of picks remaining are both associated with the plurality of player selectable selections. This embodiment increases the player's enjoyment because each selection the player selects may either increase or decrease the number of picks of selectable selections the player may make and subsequently effect if the player will obtain another award. It should be appreciated that in this embodiment, if a player pick modifier is associated with a selected selection, the non-selected selections in that selection set are not spent or marked and may be selected in subsequent player selections.

Figure 6A:
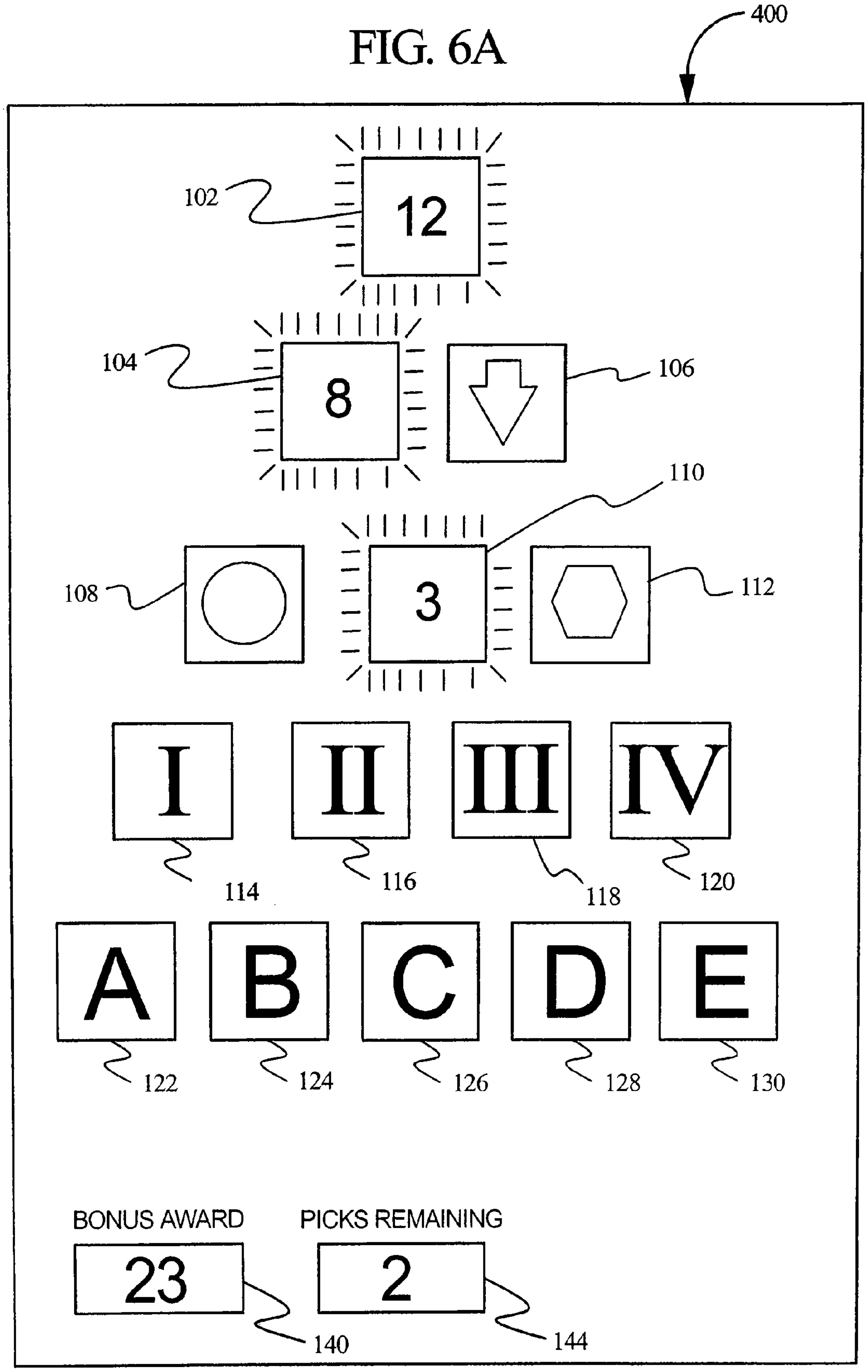
FIGS. 6A through 6D are front elevation views of another embodiment of the present invention, and illustrating an example of a player pick modifier associated with a selectable selection.
Figure 6B:
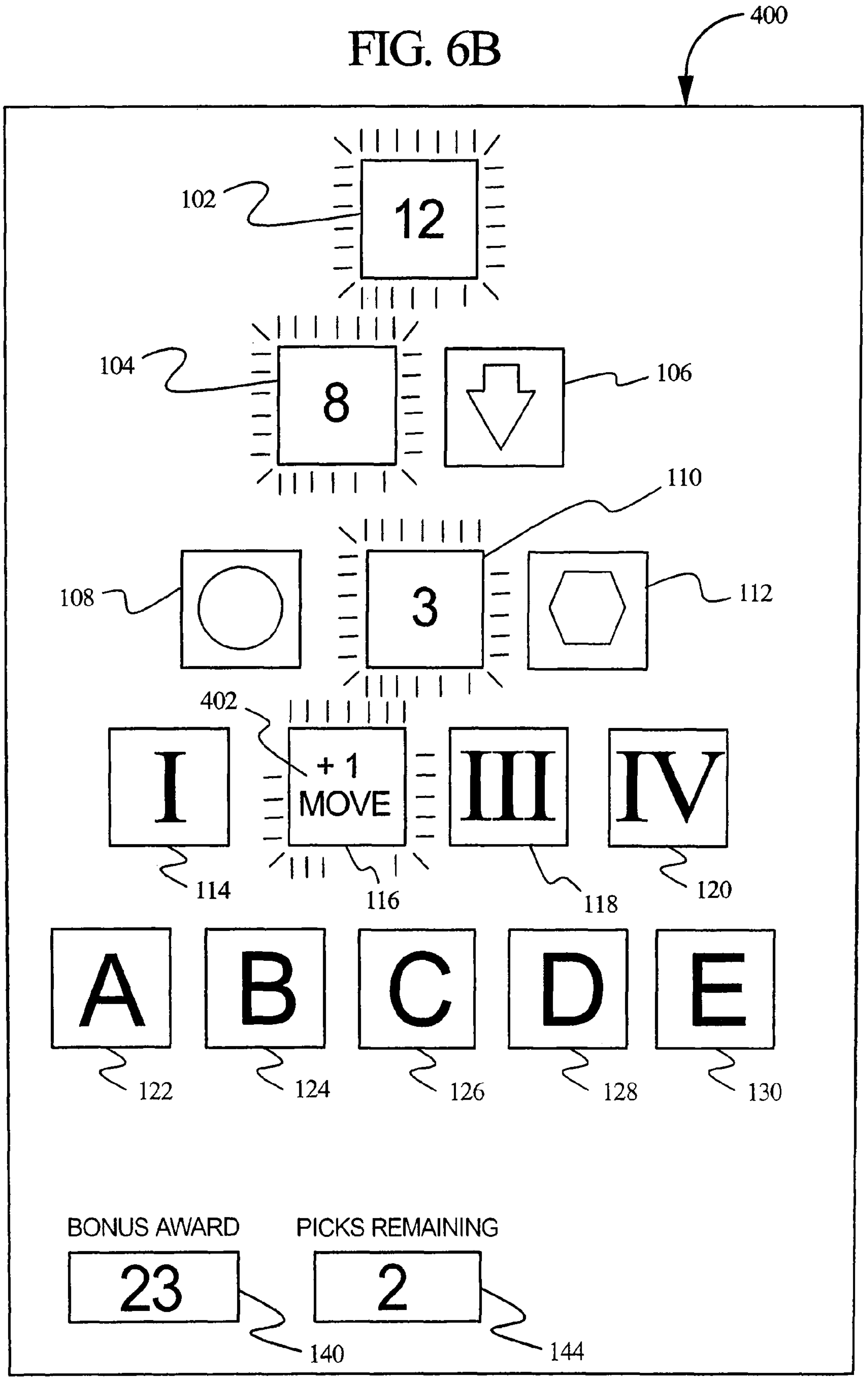
Figure 6C:
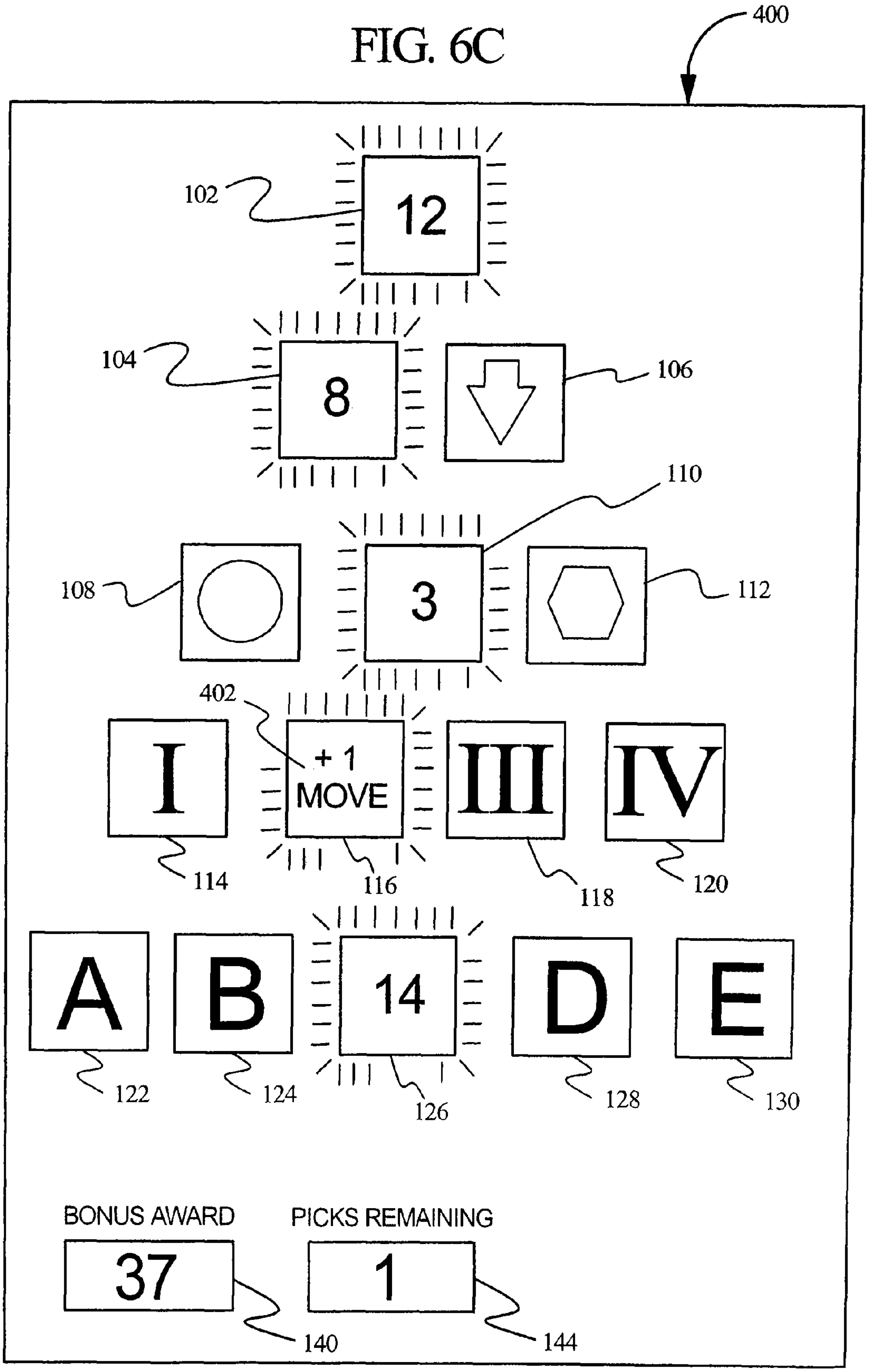
Figure 6D:
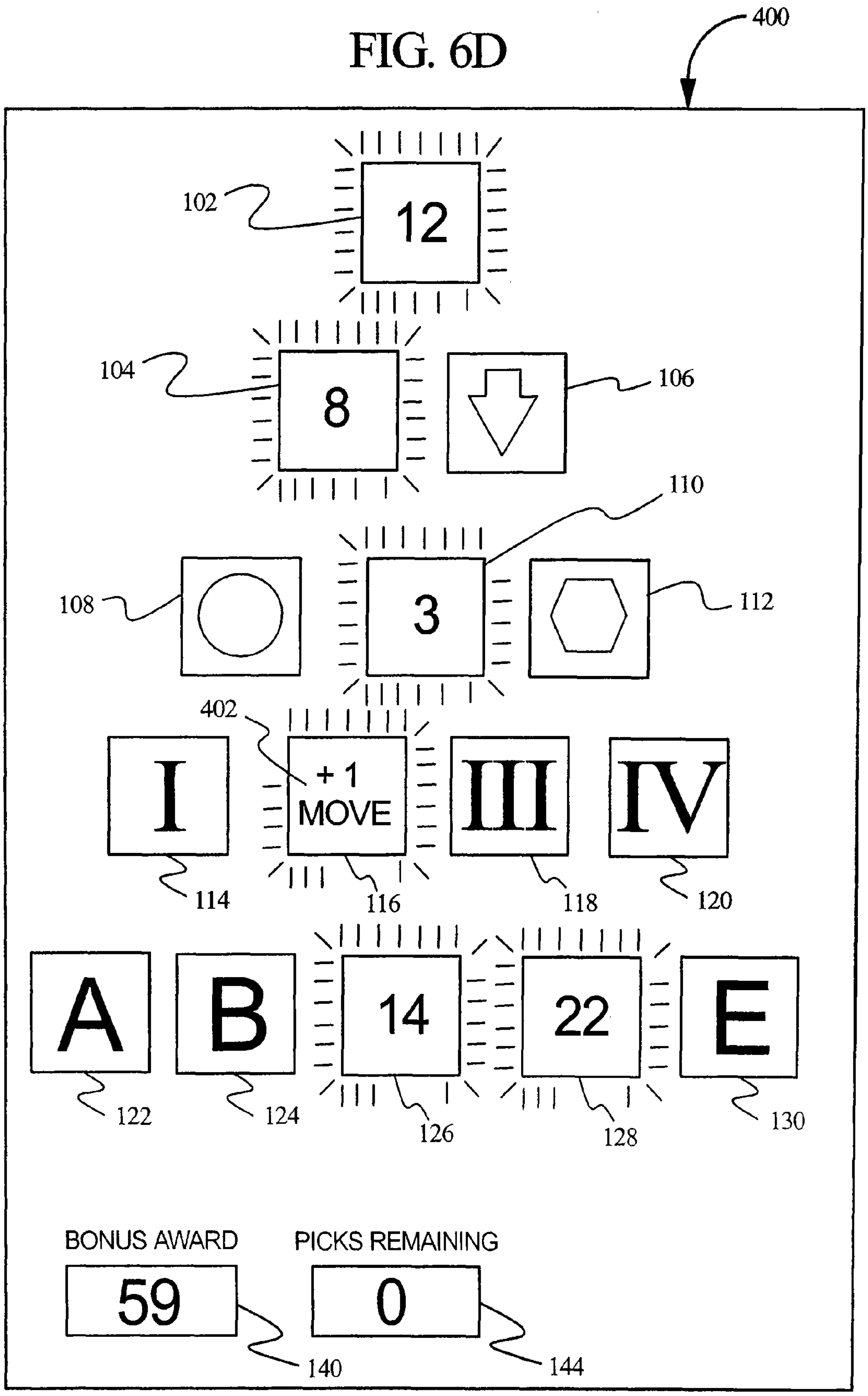

FIG. 6A illustrates the alternative embodiment of the present invention already in progress. As seen in FIG. 6A, the player had already selected three adjacent selections for a bonus award amount totaling twenty-three credits. In this embodiment, each selected selection is revealed immediately after it is selected. As indicated in the number of picks of selectable selections remaining display 144, the player had two picks of selectable selections remaining. As seen in FIG. 6B, the player's next selection 116 revealed an associated player pick modifier 402 that increased the number of picks of selectable selections remaining by one additional pick. Accordingly, the number of picks of selectable selections remaining remained at two. This represents the picks remaining being reduced by one for the subsequent selection and being increased by one for the obtained player pick modifier 402. As seen in FIG. 6C, the player's next selection was selection 126 which revealed an associated award amount of fourteen. It should be appreciated that at this point the player has selected a selection from each selection set but the player still has one pick of a selectable selection remaining. Accordingly, in this embodiment if the player obtains a player pick modifier that increases the number of picks of selectable selections, the non-selected selections from each selection set are not spent and may be selected in subsequent player selections. In another embodiment, if the player obtains a player pick modifier that increases the number of picks of selectable selections, the non-selected selections from the selection set which included the player pick modifier are not spent and may be selected in subsequent player selections. It should be appreciated that while the player may select more than one selectable selection from each selection set, each subsequent player selection must be adjacent or otherwise related to the last selected selection. Accordingly as seen in FIG. 6D, the player's next selection 128 was from the same selection set as the last selected selection 126. The player's subsequent selection 128 reveals an award amount of twenty-two. The player's total bonus award amount is increased to fifty-nine credits as displayed in the bonus award display 140.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

at least one display device;

at least one input device;

at least one processor; and at least one memory device which stores a plurality of instructions, which when executed by the at least one processor, cause the at least one processor to operate with the at least one display device and the at least one input device to control each play of a game by:

(a) causing a pick of one of a plurality of selections in one of a plurality of levels, wherein:

(i) at least one of said levels is related to at least another one of said levels;

(ii) a plurality of selections are in each of said levels, wherein for each of said levels, said selections in said level are only in said level;

(iii) at least one award is associated with at least one of said selections; and (iv) only one of the selections in each of said levels may be picked;

(b) limiting at least one selection in at least another one of said levels from being subsequently picked in the play of the game prior to causing any picks of any selections in said level which includes the selection which is limited from being subsequently picked, wherein said level which includes the selection which is limited from being subsequently picked in the play of the game is related to the level of said picked selection;

(c) causing a repeat of (a) to (b) for at least another one of said levels, wherein (a) to (b) are repeated until a terminating event occurs; and (d) causing a display of any award associated with the picked selections.

2. The gaming device of claim 1, wherein at least one of said selections is selectable by a player.

3. The gaming device of claim 1, wherein the level which includes the selection which is limited from being subsequently picked in the play of the game is directly related to the level of said picked selection.

4. The gaming device of claim 1, wherein the level which includes the selection which is limited from being subsequently picked in the play of the game is indirectly related to the level of said picked selection.

5. The gaming device of claim 1, wherein when executed by said at least one processor, said plurality of instructions cause the at least one processor to control the play of the game by limiting a plurality of selections in at least one of said levels from being subsequently picked in the game, wherein said selections which are limited from being subsequently picked in the play of the game are based on the picked selection.

6. The gaming device of claim 1, wherein when executed by said at least one processor, said plurality of instructions cause the at least one processor to control the play of the game by limiting a plurality of selections in a plurality of said levels from being subsequently picked in the game, wherein said selections which are limited from being subsequently picked in the play of the game are based on the picked selection.

7. The gaming device of claim 1, wherein said terminating event occurs if one of the selections in each of said levels is picked.

8. The gaming device of claim 1, wherein at least one terminator is associated with at least one of said selections and said terminating event occurs if the picked selection is associated with one of said terminators.

9. The gaming device of claim 1, wherein when executed by said at least one processor, said plurality of instructions cause the at least one processor to control the play of the game by causing: (i) a deselection of at least one of any previously selected selections; (ii) a selection of at least one of said previously unselected selections; or (iii) a deselection of at least one of any previously selected selections and a selection of at least one of said previously unselected selections.

10. A method of operating a gaming device, said method comprising:

(a) causing a pick of one of a plurality of selections in one of a plurality of levels, wherein at least one of said levels is related to at least another one of said levels, each of said levels includes a plurality of selections, wherein for each of said levels, said selections in said level are only in said level, and only one of the selections in each of said levels may be picked;

(b) causing at least one processor to execute a plurality of instructions to limit at least one selection in at least one of said levels from being subsequently picked prior to causing any picks of any selections in said level which includes the selection which is limited from being subsequently picked, wherein said level which includes the selection which is limited from being subsequently picked in the play of the game is related to the level of said picked selection;

(c) causing a repeat of (a) to (b) for at least another one of said levels, wherein (a) to (b) are repeated until a terminating event occurs; and (d) causing at least one display device to display any award associated with the picked selections.

11. The method of claim 10, wherein at least one of said selections is selectable by a player.

12. The method of claim 10, wherein the level which includes the selection which is limited from being subsequently picked is directly related to the level of said picked selection.

13. The method of claim 10, wherein the level which includes the selection which is limited from being subsequently picked is indirectly related to the level of said picked selection.

14. The method of claim 10, which includes causing the at least one processor to execute the plurality of instructions to limit a plurality of selections in at least one of said levels from being subsequently picked in the game, wherein said selections which are limited from being subsequently picked are based on the picked selection.

15. The method of claim 10, which includes causing the at least one processor to execute the plurality of instructions to limit a plurality of selections in a plurality of said levels from being subsequently picked in the game, wherein said selections which are limited from being subsequently picked are based on the picked selection.

16. The method of claim 10, wherein said terminating event occurs if one of the selections in each of said levels is picked.

17. The method of claim 10, wherein at least one terminator is associated with at least one of said selections and said terminating event occurs if the picked selection is associated with one of said terminators.

18. The method of claim 10, which includes causing: (i) a deselection of at least one of any previously selected selections; (ii) a selection of at least one of said previously unselected selections; or (iii) a deselection of at least one of any previously selected selections and a selection of at least one of said previously unselected selections.

19. The method of claim 10, which is provided through a data network.

20. The method of claim 19, wherein the data network is an internet.

* * * * *

UNITED STATES PATENT AND TRADEMARK OFFICE

CERTIFICATE OF CORRECTION

PATENT NO. : 7,833,095 B2
APPLICATION NO. : 11/621319
DATED : November 16, 2010
INVENTOR(S) : Cuddy et al.

It is certified that error appears in the above-identified patent and that said Letters Patent is hereby corrected as shown below:

In Claim 8, Column 16, Line 18, replace “one of said terminators” with --said at least one terminator--.

In Claim 17, Column 17, Line 13, replace “one of said terminators” with --said at least one terminator--.

Signed and Sealed this
Twenty-fifth Day of January, 2011

David J. Kappos
*Director of the United States Patent and Trademark Office*